(12) United States Patent
Pochuev

(10) Patent No.: US 11,768,746 B2
(45) Date of Patent: Sep. 26, 2023

(54) MAINTAINING SECURE SESSION STATE WITH FAILOVER DURING ENDPOINT PROVISIONING

(71) Applicant: Cryptography Research, Inc., San Jose, CA (US)

(72) Inventor: Denis Alexandrovich Pochuev, Lafayette, CA (US)

(73) Assignee: Cryptography Research, Inc., San Jose, CA (US)

( * ) Notice: Subject to any disclaimer, the term of this patent is extended or adjusted under 35 U.S.C. 154(b) by 43 days.

(21) Appl. No.: 17/410,195

(22) Filed: Aug. 24, 2021

(65) Prior Publication Data

US 2022/0066891 A1    Mar. 3, 2022

Related U.S. Application Data

(60) Provisional application No. 63/072,583, filed on Aug. 31, 2020.

(51) Int. Cl.
*G06F 11/20* (2006.01)
*G06F 21/71* (2013.01)
*G06F 21/44* (2013.01)

(52) U.S. Cl.
CPC ...... *G06F 11/2028* (2013.01); *G06F 11/2097* (2013.01); *G06F 21/445* (2013.01); *G06F 21/71* (2013.01); *G06F 2201/87* (2013.01)

(58) Field of Classification Search
CPC ............. G06F 11/2028; G06F 11/2097; G06F 11/2023; G06F 11/203; G06F 11/2033; G06F 11/2038; G06F 11/2041; G06F 21/445; G06F 21/44; G06F 21/70; G06F 21/71; H04L 69/40
See application file for complete search history.

(56) References Cited

U.S. PATENT DOCUMENTS

| 7,266,715 B1 * | 9/2007 | Bazzinotti | H04L 69/40 714/4.21 |
| 9,141,814 B1 * | 9/2015 | Murray | H04L 9/0822 |
| 9,584,509 B2 * | 2/2017 | Hamburg | G06F 21/6209 |
| 2007/0038887 A1 * | 2/2007 | Witte | G06F 11/2097 714/E11.073 |

(Continued)

OTHER PUBLICATIONS

"Hardware security module" Aug. 21, 2019, Wikipedia. (Year: 2019).*

(Continued)

*Primary Examiner* — Gabriel Chu
(74) *Attorney, Agent, or Firm* — Lowenstein Sandler LLP

(57) ABSTRACT

The embodiments described herein describe technologies to maintaining a secure session state with failover during endpoint provisioning. A cluster of hardware devices can be used for provisioning endpoint devices with secrecy, integrity, access controller, high availability, minimal transaction time, and interactive transactions with multiple requests and response within a session. The embodiments are directed to a first computing device being elected as a leader and sharing context information of a session with other computing devices as followers in the cluster such that a follower can resume the session if the leader fails.

14 Claims, 21 Drawing Sheets

(56) References Cited

U.S. PATENT DOCUMENTS

| | | | | |
|---|---|---|---|---|
| 2009/0037998 A1* | 2/2009 | Adhya | ............... | H04L 69/40 |
| | | | | 726/11 |
| 2009/0193288 A1* | 7/2009 | Kakivaya | ............ | H04L 63/20 |
| | | | | 714/E11.007 |
| 2017/0285982 A1* | 10/2017 | DeArment | ......... | G06F 9/5005 |
| 2018/0157521 A1* | 6/2018 | Arikatla | ........... | G06F 9/45558 |
| 2019/0281014 A1* | 9/2019 | Lin | ................ | H04L 61/2517 |
| 2020/0028683 A1* | 1/2020 | Windle | ............. | H04L 9/088 |
| 2020/0034048 A1* | 1/2020 | Gupta | .............. | G06F 3/061 |

OTHER PUBLICATIONS

Https://learn.hashicorp.com/vault/operations/ops-reference-architecture. Downloaded Jul. 20, 2021. 24 pages.

\* cited by examiner

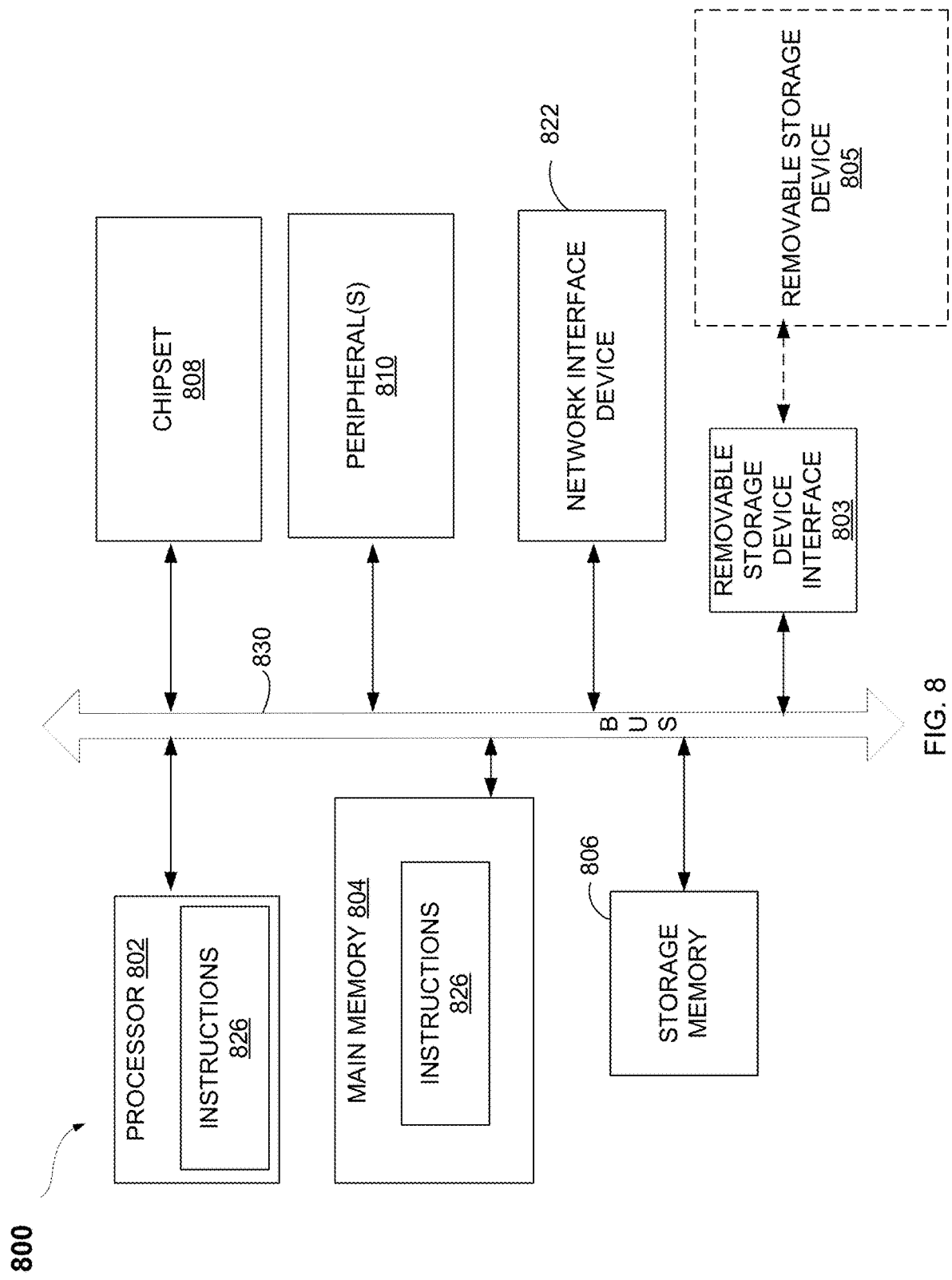

US 11,768,746 B2

MAINTAINING SECURE SESSION STATE WITH FAILOVER DURING ENDPOINT PROVISIONING

RELATED APPLICATION

This application claims the benefit of U.S. Provisional Application No. 63/072,583, filed on Aug. 31, 2020, the entire contents of which are incorporated by reference.

BACKGROUND

The need for secure systems and applications is growing. Presently, secure integrated circuits (ICs) are often programmed with security keys on the factory floor. Secure keys may be used in a variety of ways, such as, for example, to protect stored data, control access to digital content, or encrypt/authenticate data used in transactions. These keys can be stored in a one-time programmable memory, which may hold keys directly or hold a base key that is used with cryptographic functions that derive keys for various functions. Typically, security is provided by performing the key loading process in a secured facility. However, it is difficult to provide these credentials in manufacturing for some endpoint devices because of the equipment and expertise required to provide the credentials at manufacturing. Also, the computing and storage resources of some endpoint devices vary and can be limited. In an endpoint provisioning setting, there is a large set of endpoint devices in need of provisioning that communicates with backend infrastructure. Provisioning requires secrecy, integrity, access control, high availability, and a minimal transaction time, including failover events. Ideally, provisioning would also benefit from interactive transactions with multiple requests and responses, such as mutual authentication. Current solutions to provision endpoint devices use a single round-trip transaction, including a request to perform a trusted computation on a client challenge and to provide a response to the trusted computation. The single round-trip transaction only allows an endpoint device to authenticate a provisioning server. A separate single round-trip transaction would be needed to authenticate an endpoint device, but this would be an entirely new transaction, and there would be no context to the other transaction to authenticate the provisioning server. As a result, the separate transactions would not have full mutual authentication. Moreover, failure of a transaction for these current solutions is dealt with by virtue of an entirely new transaction.

BRIEF DESCRIPTION OF THE DRAWINGS

The present disclosure is illustrated by way of example, and not by way of limitation, in the figures of the accompanying drawings.

FIG. 8 is a diagram of one embodiment of a computer system in which any of the methodologies described herein may be performed according to at least one embodiment.

DETAILED DESCRIPTION

Figure 1:
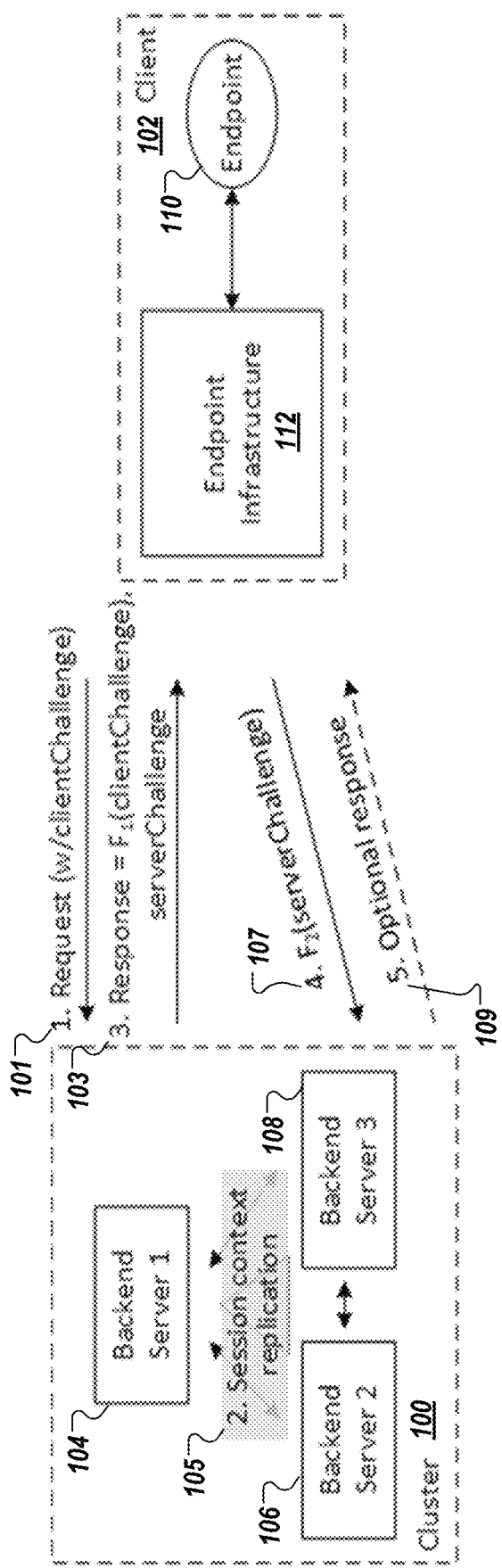
FIG. 1 is a system diagram of a provisioning cluster of hardware devices and a client in a session for provisioning an endpoint device according to at least one embodiment.

Described herein are technologies directed to maintaining a secure session state with failover during endpoint provisioning. As described above, there is a large set of endpoint devices that communicate with a backend infrastructure for endpoint provisioning. Endpoint provisioning requires secrecy, integrity, access control, high availability, a minimal transaction time, including failover events, and interactive transactions with multiple requests and responses, such as mutual authentication. Aspects of the present disclosure can provide a cluster of hardware devices for provisioning endpoint devices with secrecy, integrity, access controller, high availability, minimal transaction time, and interactive transactions with multiple requests and responses within a session. The cluster of hardware devices can maintain a secure session state and provide failover during endpoint provisioning. Aspects of the present disclosure can elect a first computing device as a leader that performs computations in a session with an endpoint device and shares context information of the session with other computing devices in the cluster that are designated as followers such that the cluster of remaining nodes can resume the session if the leader fails. Aspects of the present disclosure can provide a cluster with a leader to perform a trusted computation on a client request and provide a response to the trusted computation. The leader in the cluster can store context information and share the context information with the followers. The context information can also be stored in connection with the session so that multiple round-trip transactions can be done in the session. As such, aspects of the present disclosure can provide full mutual authentication that would use at least three messages. In the event of a failed leader during a session, aspects of the present disclosure can allow the cluster to pick up the session with the endpoint device using the context information already shared with the cluster.

Aspects of the present disclosure can use a consensus protocol to maintain session state within a provisioning cluster of hardware servers, such as hardware security modules (HSMs), such as the Reliable, Replicated, Redundant, And Fault-Tolerant (Raft) consensus protocol or the Paxos consensus protocol. Aspects of the present disclosure can provide a mechanism to ensure that a client (Endpoint Infrastructure) communicates with the leader is utilized, which can include authentication of a leader by the client and an election of a new leader in the event of a failed leader. A client can include an endpoint device and an endpoint infrastructure, such as automated test equipment operatively coupled to the endpoint device. One type of automated test equipment is a tester device. An endpoint device communicates with a leader via the endpoint infrastructure, and the leader communicates with other cluster nodes (i.e., followers). Aspects of the present disclosure can provide a cluster of nodes (e.g., hardware devices) in which some or all messages passed between the nodes are signed and/or encrypted and signed. Aspects of the present disclosure can provide a cluster of nodes (e.g., hardware devices) in which a leader performs a computation and uses consensus protocol to replicate a session state with followers. If a node goes down, the remaining cluster nodes maintain the session state. For example, if a leader goes down, a leader election mechanism can be used to elect a new leader, and an endpoint infrastructure is updated with an identity of the new leader. That is, an identifier and an address of the new leader can be sent to the endpoint infrastructure so that the endpoint infrastructure sends messages to the new leader at the new address.

FIG. 1 is a system diagram of a provisioning cluster 100 of hardware devices and a client 102 in a session for provisioning an endpoint device according to at least one embodiment. Cluster 100 of hardware devices includes one or more backend servers, including a first computing device 104, a second computing device 106, and a third computing device 108. Cluster 100 of hardware devices can include two or more backend servers. Each of computing devices 104-108 includes a memory device that stores instructions and data and a processing device operatively coupled to the memory device. In at least one embodiment, a processing device and a memory device are located within a physical security perimeter. In at least one embodiment, a processing device can include multiple processing cores or processing elements, and at least a portion of these multiple processing cores, or processing elements are located within a physical security perimeter. Similarly, each of the computing devices 104-108 includes multiple memory devices or multiple memory elements, and at least a portion of these multiple memory devices or memory elements are located within a physical security perimeter. In at least one embodiment, first computing device 104 is a hardware security module (HSM) that includes specialized hardware and a physical security perimeter. An HSM is a physical computing device that performs cryptographic operations and protects information. An HSM can perform cryptographic operations, including, for example, cryptographic key generation, key management, key storage, using cryptographic or sensitive data, encryption functions, decryption functions, signing functions, authentication functions, asymmetric cryptography, symmetric cryptography, or the like. An HSM can include one or more secure integrated circuits, also referred to as cryptographic chips, cryptographic processors, or cryptographic circuits. A physical security perimeter can be used to prevent tampering, provide tamper evidence, or make tampering difficult without making an HSM inoperable or cause an HSM to delete keys upon tamper detection.

Cluster 100 of hardware devices can be used for endpoint provisioning of one or more endpoint devices, such as endpoint device 110. Endpoint device 110 can be a System on Chip (SoC) that can communicate with a backend infrastructure, including cluster 100. In some cases, endpoint device 110 communicates with a backend structure using an endpoint infrastructure, as illustrated in client 102. That is, client 102 includes endpoint infrastructure 112 and endpoint device 110. Endpoint device 110 communicates with cluster 100 via endpoint infrastructure 112. In at least one embodiment, endpoint infrastructure 112 includes automated test equipment, such as a tester device. In at least one embodiment, endpoint infrastructure 112 is a card reader. In at least one embodiment, endpoint infrastructure includes one or more components of a user device, such as a mobile phone, wearable device, portable computer, or the like. In at least one embodiment, endpoint device 110 can include one or more integrated circuits.

During operation, cluster 100 elects first computing device 104 as a leader for a session with endpoint device 110 (or a session with client 102) for provisioning endpoint device 110. Cluster 100 can determine which of the nodes of cluster 102 is to operate as a leader. A leader can perform operations and computations and is responsible for log replication or state machine replication to other nodes in cluster 100. Cluster 100 of hardware devices designates second computing device 106 as a follower for the session and third computing device 108 as a follower for the session. In general, if a node is not a leader, the node is designated by the entire scheme as a follower. As a leader, first computing device 104 can communicate with endpoint device 110, perform operations and computations, and share context information with others in cluster 100, including second computing device 106 and third computing device 108, as illustrated in FIG. 1. By sharing context information of the session, cluster 100, including the second computing device 106 and the third computing device 180, can resume the session if the leader fails, as described in more detail below.

As described above, in an endpoint provisioning setting, there are a large set of endpoint devices in need of provisioning and these endpoint devices communicate with cluster 100 as a backend infrastructure. Cluster 100 of hardware devices can provide security and failover by satisfying requirements of secrecy, integrity, access control, high availability using redundant backend servers and failover, minimal transaction time, including failover events, and interactive sessions of with multiple transactions (e.g., multiple requests and responses within a session). Using an interactive session, cluster 100 can perform full mutual authentication that requires multiple round-trip transactions with at least three messages, such as described in an example illustrated in FIG. 1.

As illustrated in FIG. 1, client 102 (endpoint device 110 via endpoint infrastructure 112) sends a first message 101 to cluster 100. First message 101 can include a request with a client challenge to authenticate first computing device 104 (or generally cluster 100). A request in first message 101 can initiate a session or a session can already be initiated. As an elected leader, first computing device 104 receives first message 101 and performs a first operation on the client challenge to obtain a first result. For example, a first operation can be a cryptographic function of the client challenge ($F_1$(clientChallenge)). First computing device 104, after receiving an acknowledgment from a quorum of cluster members, generates a response with the first result and a server challenge and sends a second message 103 back to the client 102. Second message 103 includes the response with the first result ($F_1$(clientChallenge) and a server challenge to authenticate endpoint device 110 (or client 102). In at least one embodiment, first computing device 104 determines the context information of the session based on at least some information in first message 101. In at least one embodiment, first computing device 104 replicates the context information with at least second computing device 106 and third computing device 108 illustrated in FIG. 1. Context information can include the first result, the server challenge, and/or additional information concerning the session, such as counts, timestamps, an identifier of client 102, an address of client 102, an identifier of endpoint infrastructure 112, an identifier of endpoint device 110, an address of endpoint infrastructure 112, an address of endpoint device 110, or the like.

Client 102 receives second message 103 from first computing device 104. Client 102 can perform a second operation on the first result to authenticate first computing device 104. For example, client 102 performs a cryptographic function on the first result to obtain a third result and compares the third result against the client challenge sent in first message 101 to authenticate first computing device 104. First computing device 104 is authenticated with the third result matches the client challenge. Client 102 can also perform a third operation on the server challenge to obtain a second result. For example, a second operation can be a cryptographic function of the server challenge ($F_2$(server-Challenge). Client 102 generates a response with the second result and sends a third message 107 back to first computing device 104. Third message 107 includes the response with the second result ($F_2$(serverChallenge) and a server challenge to authenticate endpoint device 110 (or client 102). First computing device 104 performs a fourth operation on the second result to authenticate endpoint device 110. For example, first computing device 104 performs a cryptographic function on the second result to obtain a fourth result and compares the fourth result against the server challenge to authenticate endpoint device 110 (or client 102). Endpoint device 110 (client 102) is authenticated with the fourth result matches the server challenge. First computing device 104 stores updated context information of the session and performs a session context replication process 105 with others in cluster 100. In at least one embodiment, first computing device 104 replicates the updated context information with at least second computing device 106 and third computing device 108 illustrated in FIG. 1. Updated context information can include the first result, the server challenge, and the second result and/or additional information concerning the session, such as counts, timestamps, an identifier of client 102, an address of client 102, an identifier of endpoint infrastructure 112, an identifier of endpoint device 110, an address of endpoint infrastructure 112, an address of endpoint device 110, or the like. Update context information can include only new information, such as the second result computed by first computing device 104.

In at least one embodiment, first computing device 104 after authenticating client 102, sends, in the session, a fourth message 109 to the client 102. A protocol can include some payload, which is sent from a server to the client after the client is authenticated. In one embodiment, fourth message 109 can include a payload and the payload can depend on the use case being run by the infrastructure. Alternatively, four messages 109 can include other data that is shared between first computing device 104 and the client 102.

In at least one embodiment, first computing device 104 shares context information using a consensus protocol. In general, a consensus protocol is a set of rules that each node (e.g., computing devices 104, 106, 108) of a cluster (e.g., 100) uses to agree on a data value or data values used or determined by a computation. In an endpoint provisioning setting, a consensus protocol can include formal requirements for security and failure, including secrecy, integrity, access control, high availability, minimal transaction time, and interactive sessions with multiple requests and responses. Cluster 100 of hardware devices uses a consensus protocol to maintain a session state within the cluster 100. In at least one embodiment, messages exchanged between cluster nodes are signed and/or encrypted and signed. That is, first computing device 104 can share the context information of the session with at least second computing device 106 by sending a signed message to second computing device 106, the signed message including the context information. A cluster node can be one or more computing devices that communicate with other cluster nodes and communicate with a client when elected as a leader of a cluster. That is, a mechanism can be used to ensure that client communications with client 102 are done by a leader of a cluster. The mechanism can include authentication of a leader or a new leader, when changed. More specifically, first computing device 104, when elected as a leader of cluster 100, communicates with endpoint device 110 via endpoint infrastructure 112 by exchanging messages and communicates with other cluster nodes, such as second computing device 106 and third computing device 108 by exchanging messages. As noted above, these messages can be signed and/or encrypted and signed. First computing device 104, when elected as a leader performs a computation and uses a consensus protocol to replicate a session state with other clusters nodes, by sending the session state in messages to be stored by the other cluster nodes, such as second computing device 106 and third computing device 108. If first computing device 104 fails, the remaining cluster nodes maintain the session state and include a leader election mechanism, which is used to elect a new leader. In an event of a leader election, an identity of a new leader can be communicated to client 102 so subsequent messages can be sent to the new leader by client 102. An identifier of a new leader can be communicated to client 102 in a trusted manner. Using a consensus protocol, cluster 100 can achieve security and failover for provisioning transactions. In at least one embodiment, protocol separation can be achieved where endpoint device 110 communicates with cluster 100 as a whole, abstracting away communications by an endpoint device with an individual server.

In at least one embodiment, first computing device 104 uses a consensus algorithm that distributes a state machine across cluster 100. Distributing a state machine across a cluster is also referred to as state machine replication. In at least one embodiment, the consensus algorithm can be similar to the Raft consensus algorithm that ensures that each node in the cluster agrees upon a same series of state transitions. In at least one embodiment, the consensus algorithm can be similar to the Paxos consensus algorithms. Using state machine replication, a node in cluster 100 can pick up the session if a current server fails or otherwise stops functioning. For example, if first computing device 104 fails before receiving third message 107, a new leader is elected using a leader election mechanism. The new leader, such as second computing device 106, already has the session state of the session and can receive third message 107 and can perform the cryptographic function on the second result, instead of first computing device 104 to authenticate endpoint device 110.

As described above communications between nodes of cluster 100 can be signed or signed and encrypted. In at least one embodiment, cluster 100 can establish a mutual trust between nodes using a trust authority (TA), such as illustrated and described below with respect to FIG. 2.

In other embodiments, messages exchanged between cluster 100 and endpoint device 110 can include any multi-round protocol, which may not include challenges. That is, cluster 110 can perform operations in connection with messages received to obtain results and these results are part of a session context that is shared with nodes of cluster 100. It should also be noted that operations do not have to be performed by any one node of cluster 100. In some embodiments, a more complex protocol can be used in which several nodes of cluster 100 are involved in performing a computation and the computation results are replicated using a consensus protocol.

Figure 2:
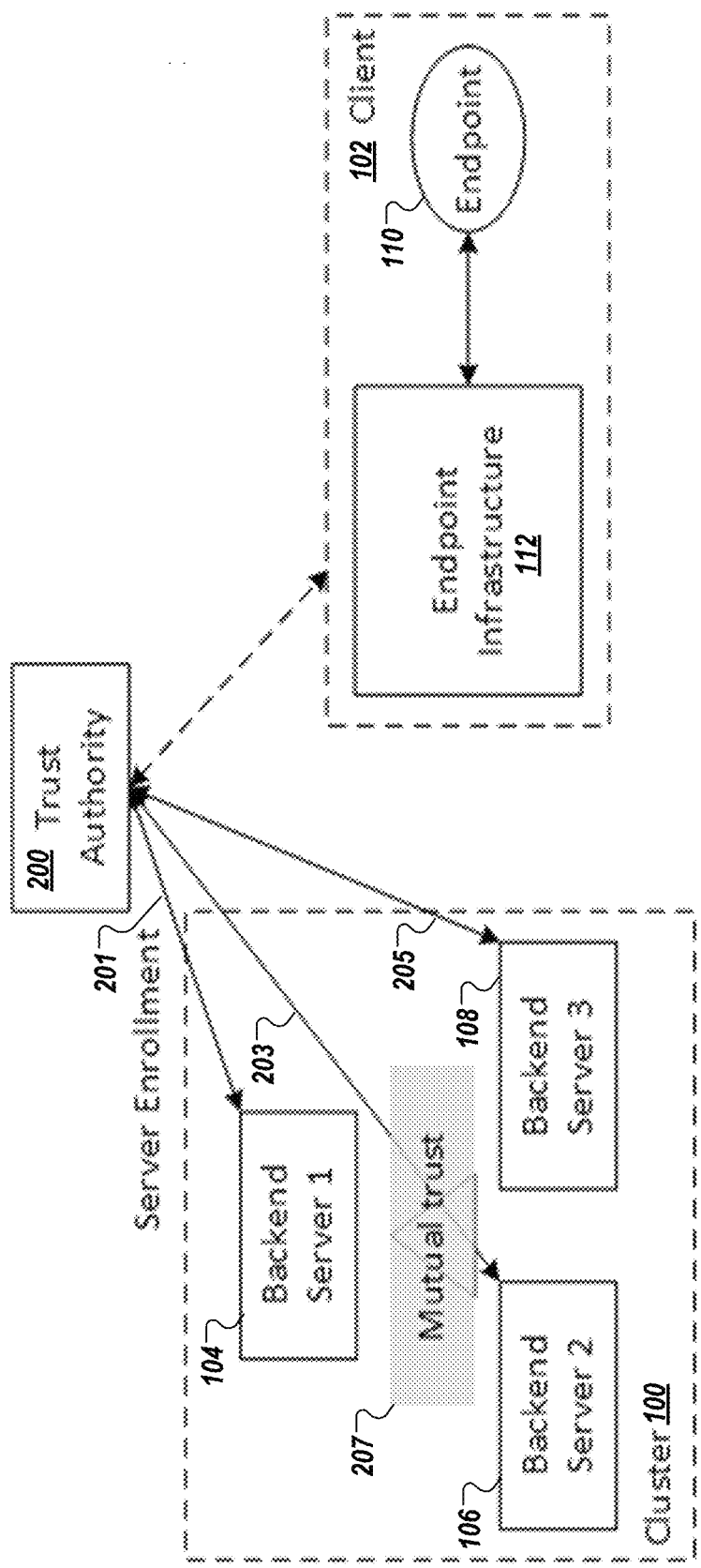
FIG. 2 is a system diagram of a trust authority that is used for server enrollment to establish mutual trust between nodes of the cluster of hardware devices of FIG. 1 according to at least one embodiment.

FIG. 2 is a system diagram of a trust authority 200 that is used for server enrollment to establish a mutual trust 207 between nodes of cluster 100 of FIG. 1 according to at least one embodiment. Trust authority 200 can be one or more computing devices that facilitate an enrollment process for nodes of cluster 100. To be part of cluster 100 of computing devices for provisioning endpoint devices, first computing device 104 communicates messages 201 with trust authority 200 to enroll as part of cluster 100. Similarly, second computing device 106 communicates messages 203 with trust authority 200 to enroll as part of cluster 100 and third computing device 108 communicates messages 205 with trust authority 200 to enroll as part of cluster 100. One example of an enrollment process (also referred to as trust establishment) is sharing of a secret key, which is used in a symmetric encryption/signing mechanism setting, possibly along with the key derivation. Alternatively, trust establishment can be done in an asymmetric setting. In that case, Trust Authority 200 is a certificate authority, which can issue certificates, corresponding to the keys residing on each of the servers. These certificates and corresponding private keys are used in asymmetric encryption/signing mechanisms. Note that in either case, enrollment is done in a trusted environment. As a result of server enrollment, each of first computing device 104, second computing device 106, and third computing device 108 can sign messages exchanged between each other, establishing mutual trust 207 between nodes of cluster 100.

In at least one embodiment, trust authority 200 can provide endpoint infrastructure enrollment as well. For enrollment, endpoint infrastructure 112 communicates messages 209 with trust authority 200 to enroll as a trusted endpoint infrastructure. In at least one embodiment, endpoint infrastructure enrollment can include trust authority 200 sending a public key associated with trust authority 200 to endpoint infrastructure 112.

As described above, cluster 100 can provide failover by electing a node as a leader for a session and sharing context information of the session with other nodes so that one of the other nodes can resume the session if the leader fails. When a leader fails, a leader election process is initiated, such as illustrated and described below with respect to FIG. 3.

Figure 3:
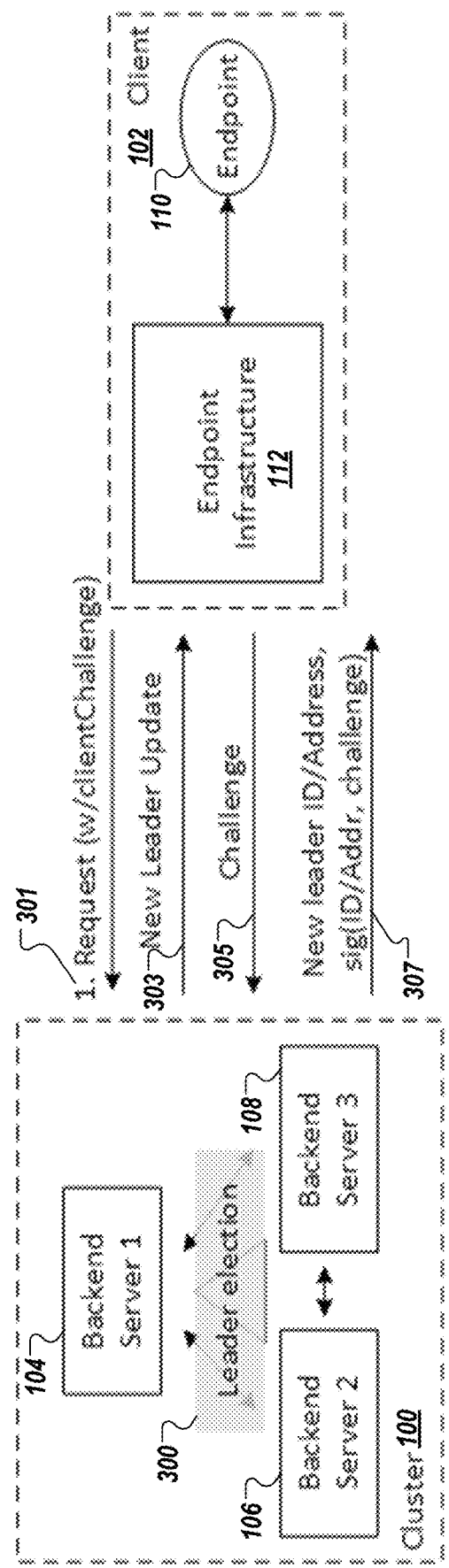
FIG. 3 is a system diagram of a leader election process within a provisioning cluster of hardware devices during a session with a client according to at least one embodiment.

FIG. 3 is a system diagram of a leader election process 300 within a provisioning cluster 100 during a session with client 102 according to at least one embodiment. Client 102 sends a first message 301, including a request with a client challenge, to cluster 100. If first computing device 104 is still operational, first computing device 104 receives first message 301. If first computing device 104 has failed, leader election process 300 is initiated among the other nodes of cluster 100. Each node of cluster 100 is elected as either a leader or a follower and can be a candidate of leader election process 300 if a leader becomes unavailable. A leader can periodically send a heartbeat message (or other status signals) to each follower. Each follower can use a timeout in which it expects to receive a heartbeat message from the leader. A timeout is reset on receiving a heartbeat message. If no heartbeat message is received, a follower changes its status to candidate and starts leader election process 300. Failing to receive a heartbeat message before a timeout is an indication of the leader failing, the leader becoming nonresponsive or nonoperational. Since each follower is expecting a heartbeat message from the leader, when a leader fails, multiple followers can initiate concurrent leader election processes. There can be a mechanism to handle this scenario, such as a count or timestamp to indicate a first of multiple concurrent leader election processes so that later leader election processes can be stopped.

First computing device 104 continues as a leader until it fails or disconnects, in which case leader election process 300 is initiated to elect a new leader. Also, when a consensus algorithm initializes, leader election process 300 will also initiate. When an existing leader, first computing device 104 in this example, fails a new leader is elected by leader election process 300. In this example, second computing device 106 is elected as a new leader and a new term starts. Terms can be tracked by a term counter. As noted above, as a backend server receives no communication by the leader over a period, such as a timeout, it assumes that there is no acting leader anymore and changes its status from follower to a candidate server. The candidate server starts leader election process 300 by increasing a term counter, voting for itself as a new leader, and sending a message to all other servers. If a candidate server receives a message with a term number at least as large as the candidate's current term count, then the candidate's election is defeated and the candidate changes into a follow and recognizes the other candidate server as the new leader. However, if a candidate server receives a majority of votes, then it is elected as the new leader. In a case of a split vote, leader election process 300 can be restarted until a single candidate is elected as leader by consensus.

Once a new leader is elected by leader election process 300, second computing device 106, elected as the new leader, sends a second message 303 to client 102. Second message 303 can include an indication of a new leader update. In response, client 102 can send a third message 305 back to second computing device 106. Third message 305 can include a new challenge. Second computing device 106 can perform a cryptographic operation to generate a signature of an identifier of second computing device 106, an address of second computing device 106, and the new challenge. Second computing device 106 sends a fourth message 307 back to client 102. Fourth message 307 can include the identifier and address of second computing device 106 and the signature. Client 102 can communicate with second computing device 106 in a same session as with first computing device 104.

A leader can be responsible for state machine replication or log replication to followers. In at least one embodiment, a leader of cluster 100 maintains a secure session state by log replication. A leader receives a request, including a command to be executed by replicated state machines in cluster 100. After being added to a leader's log as a new entry, each request is forwarded to followers in cluster 100 until the log entry is eventually stored by all followers in cluster 100. Once stored, a follower can send a confirmation. Once a leader receives confirmations from a majority of followers than an entry has been replicated, a leader applies the entry to its local state machine and the request is considered committed. This is done to ensure consistency of logs between backup servers in cluster 100. These forwarded request scan be sent in AppendEntries type messages. In at least one embodiment, a leader of cluster 100 maintains a secure session state by log replication of context information, such as information computed by a leader. Once a leader has computed information, the leader stores context information as a log entry and replicates the log entry by forwarding the log entry to followers in cluster 100. In this manner, a leader shares context information of a session such that a follower can resume the session if the leader fails. An example of log replication is illustrated and described below with respect to FIGS. 4A-4N. The following description uses the Raft consensus protocol to illustrate requests being made to a provisioning cluster that can use the embodiments described above to share context information of a session with the cluster for failover.

Figure 4A:
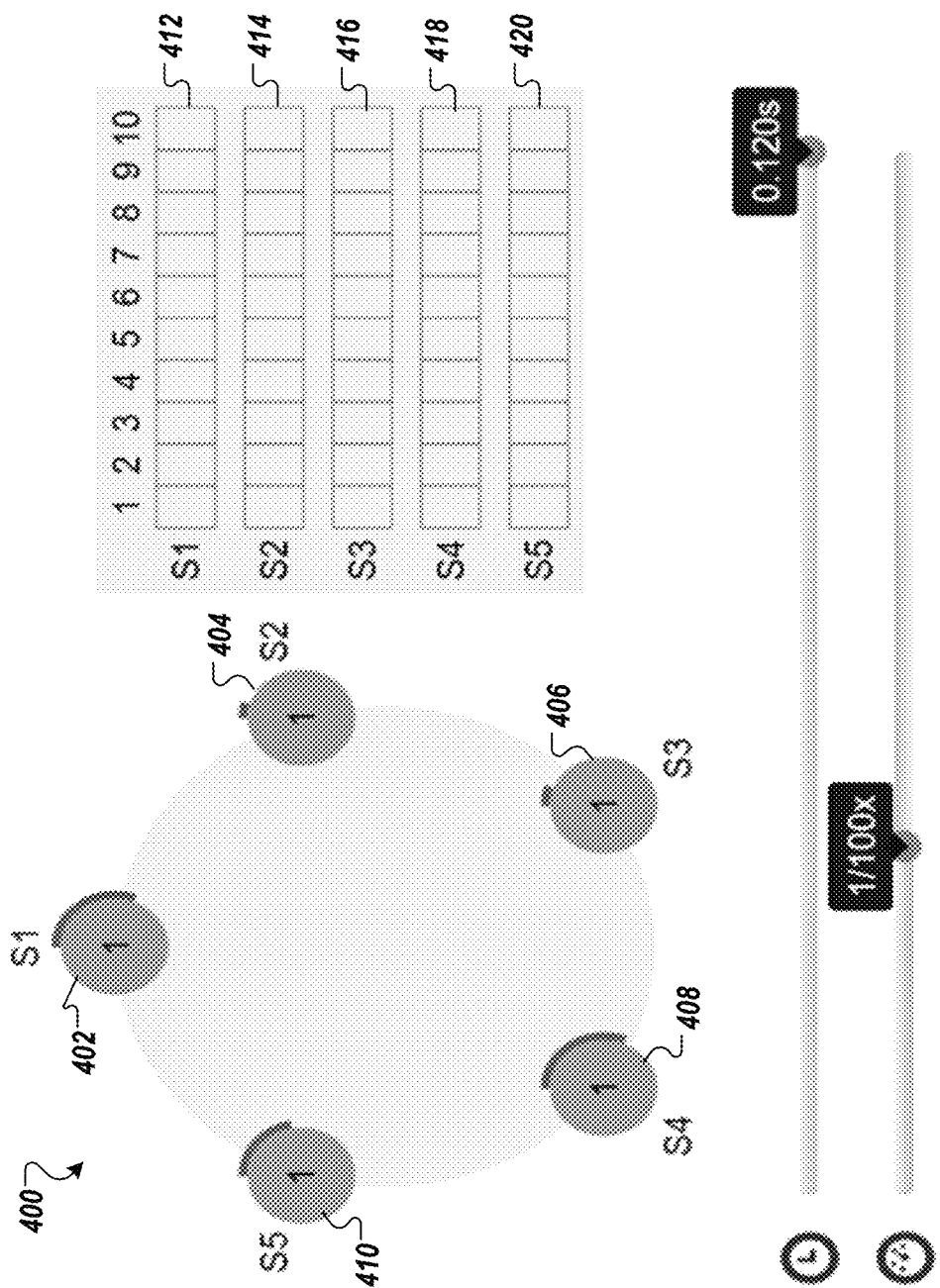
FIGS. 4A-4N illustrate example messages sent between server devices of a provisioning cluster according to at least one embodiment.
Figure 4B:
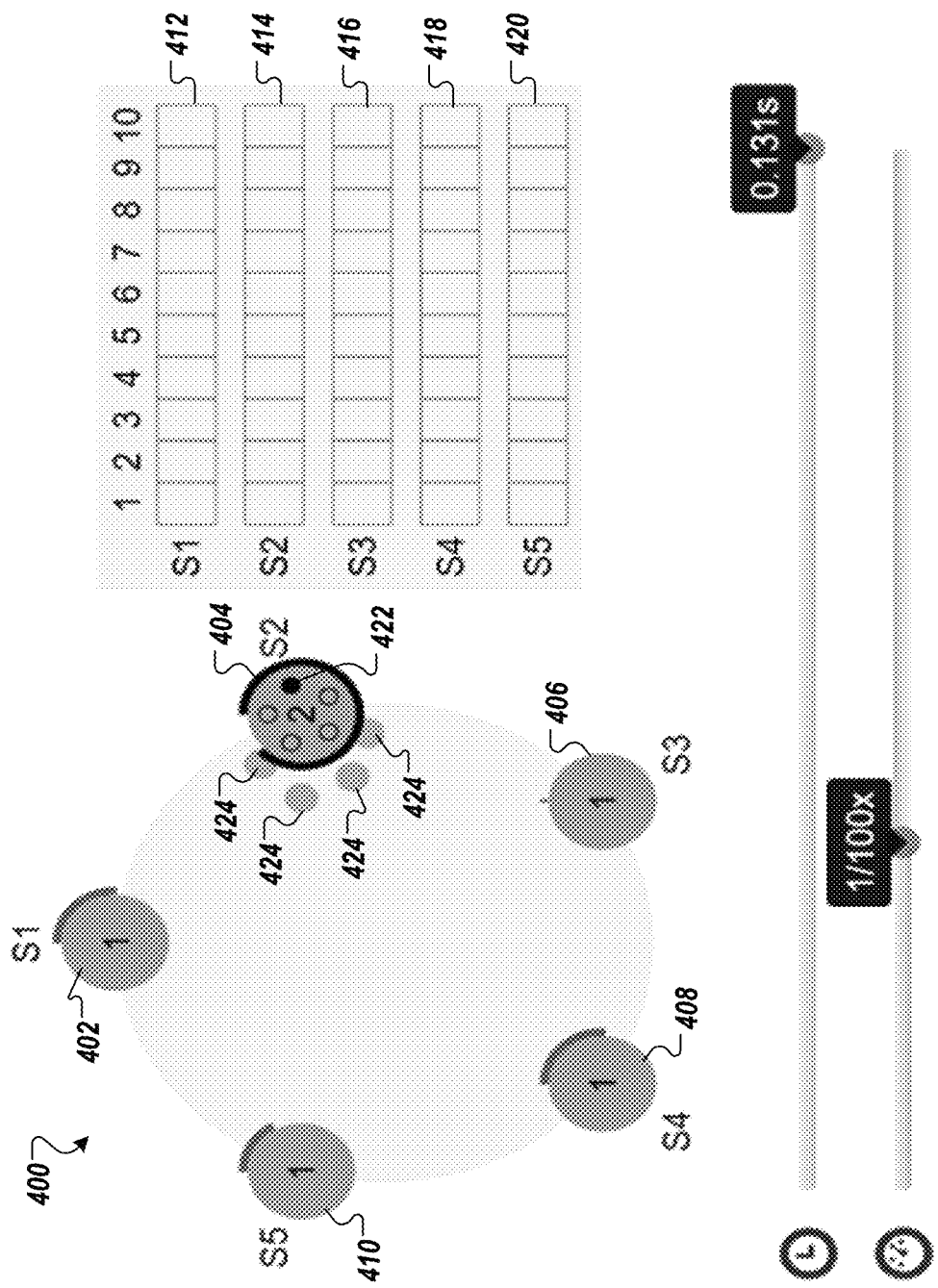
Figure 4C:
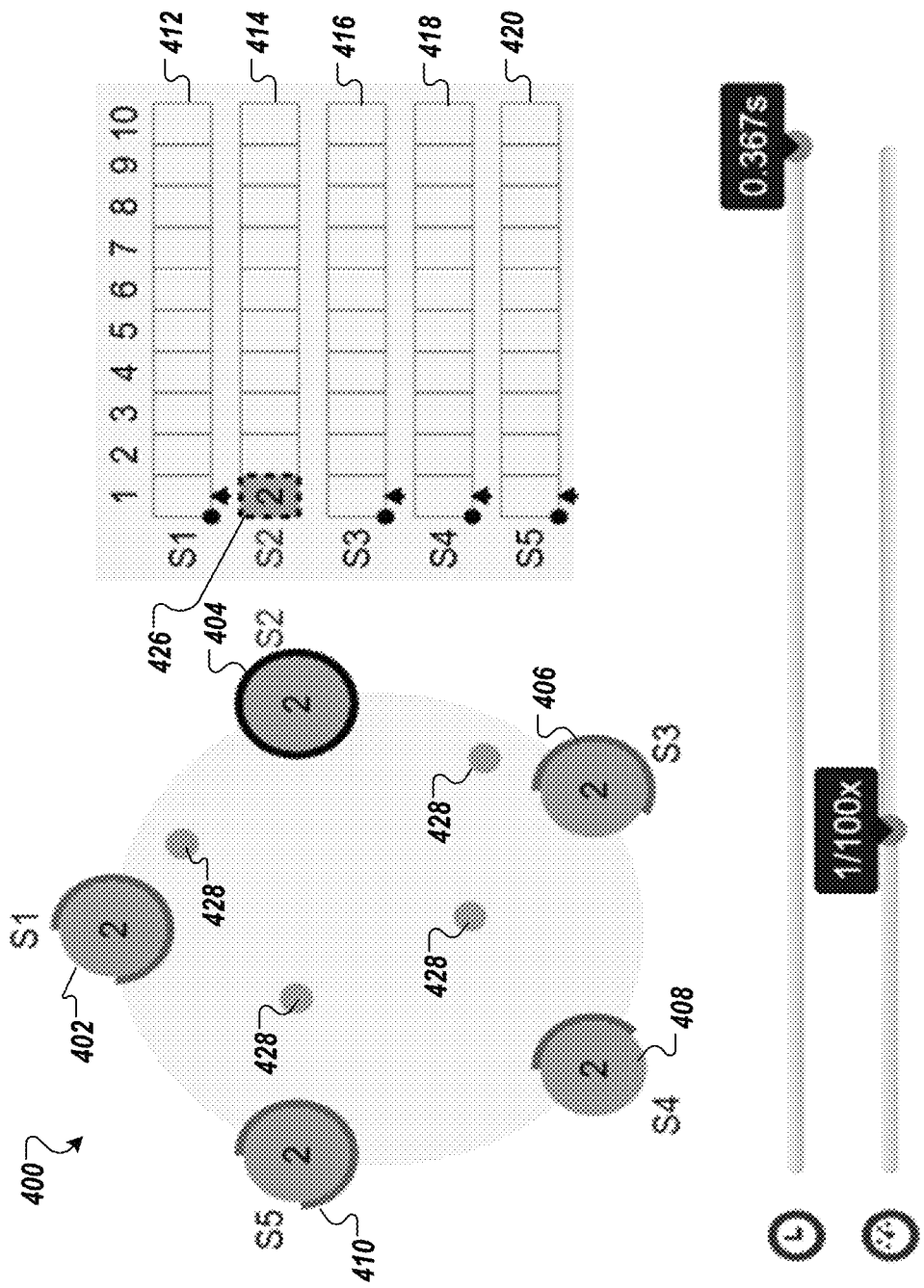
Figure 4D:
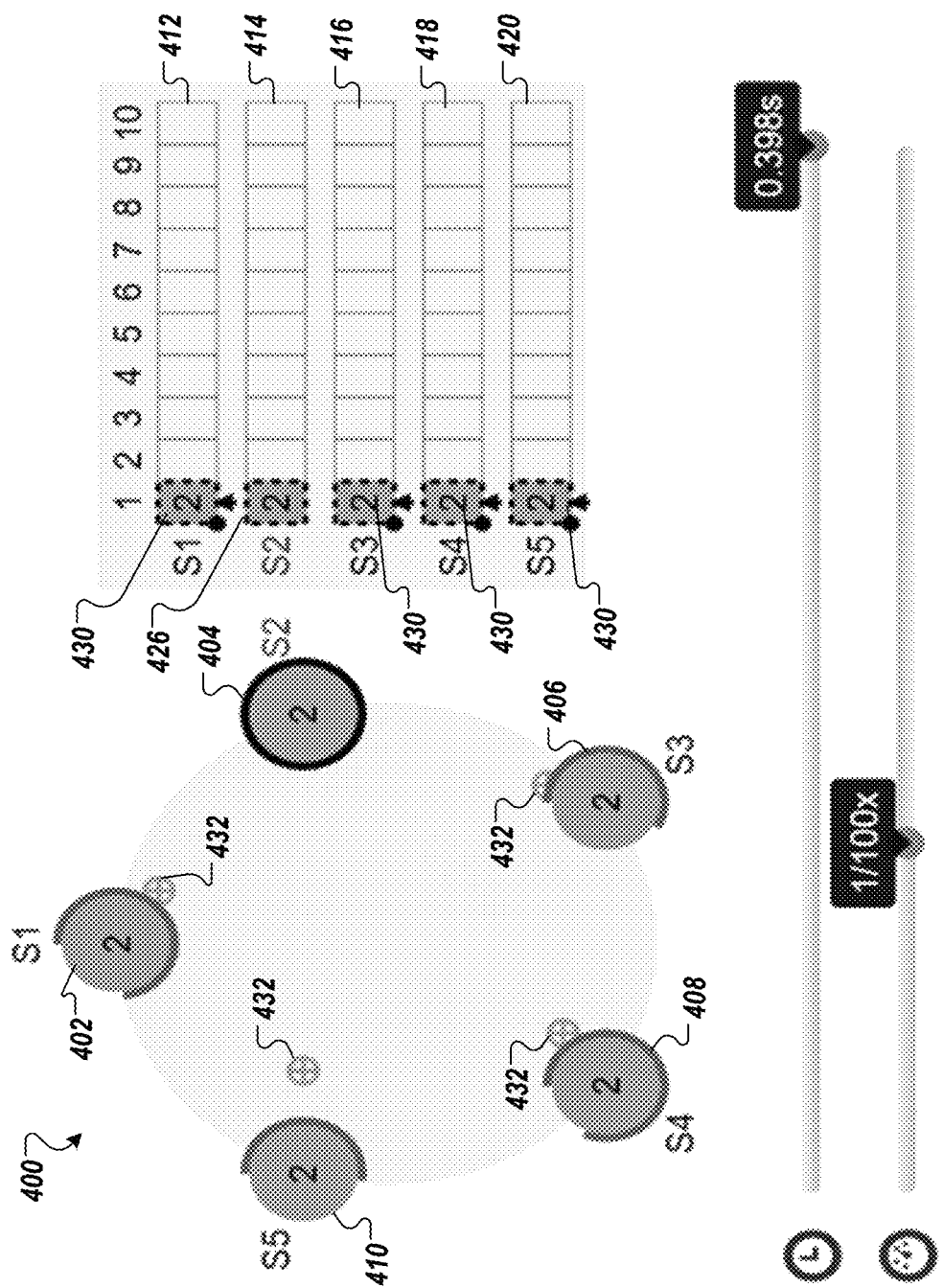
Figure 4E:
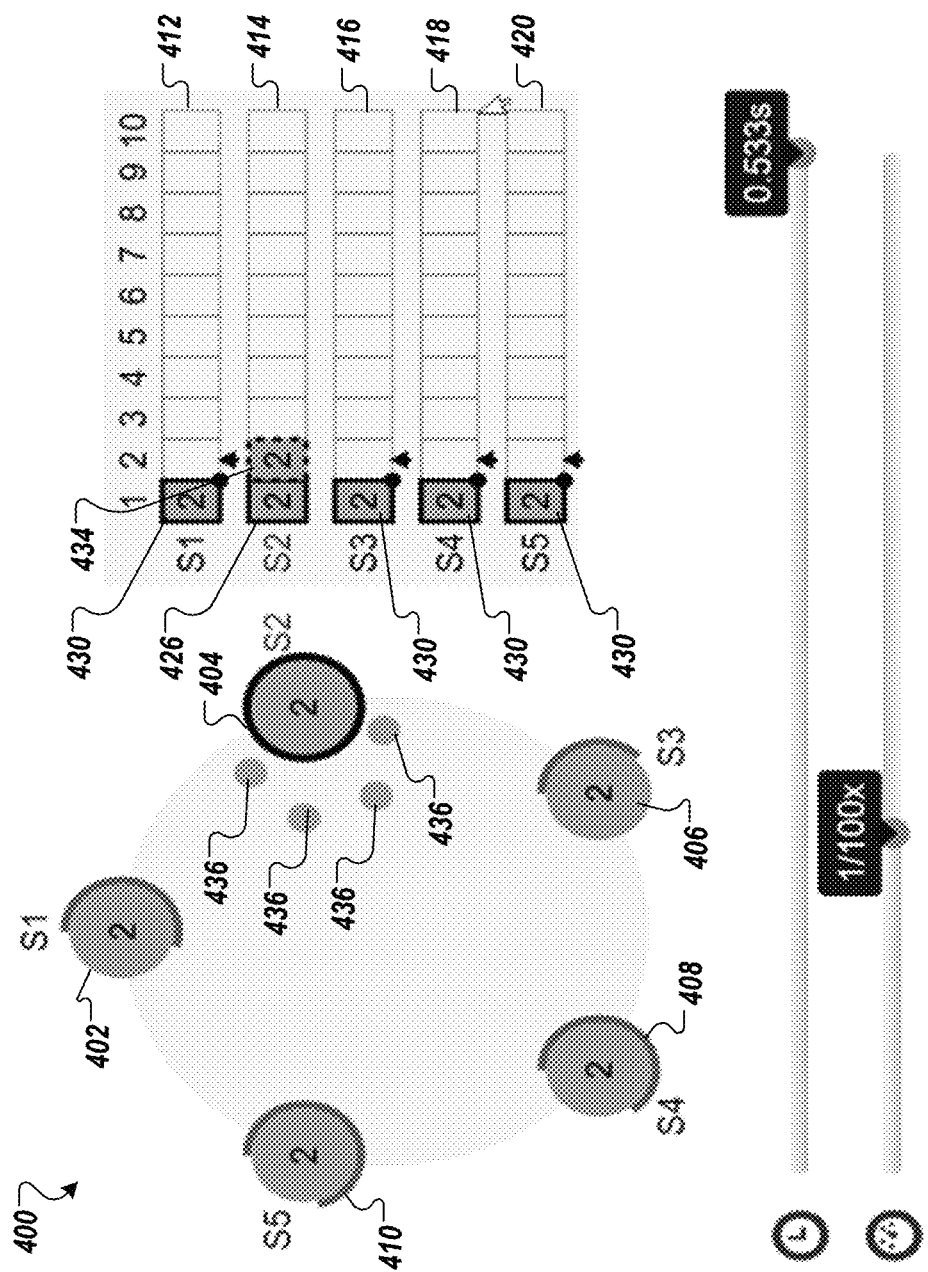
Figure 4F:
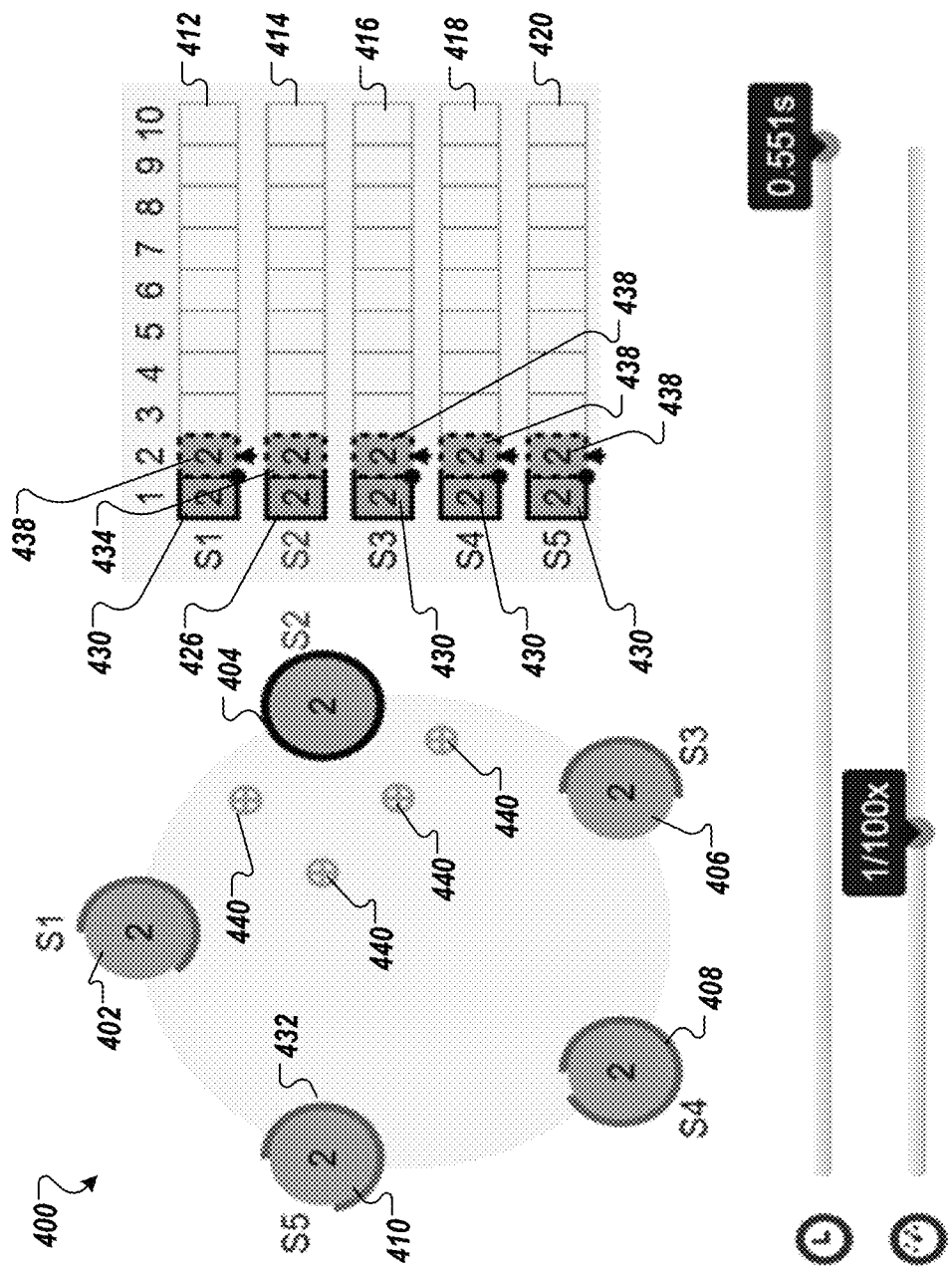
Figure 4G:
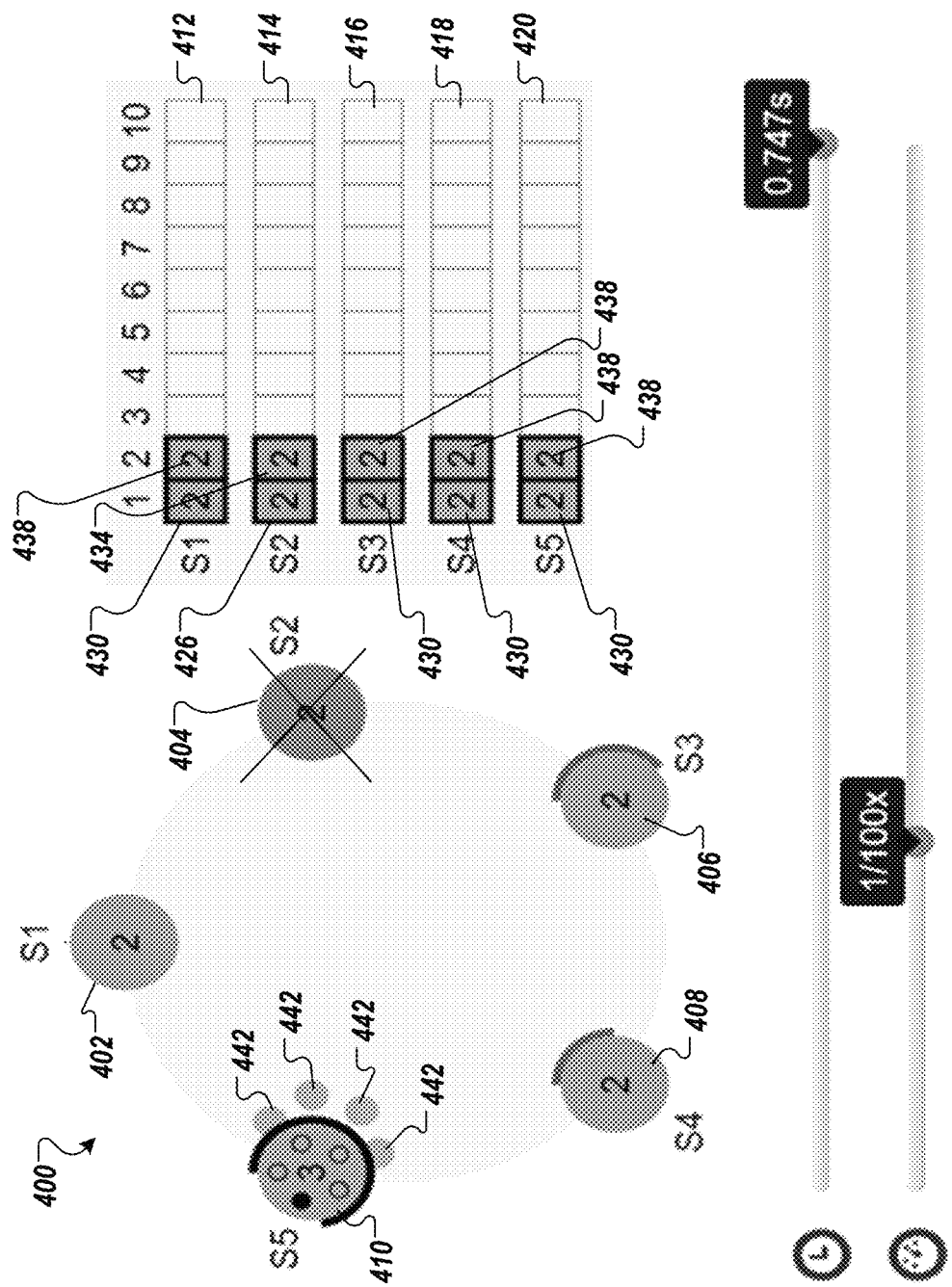
Figure 4H:
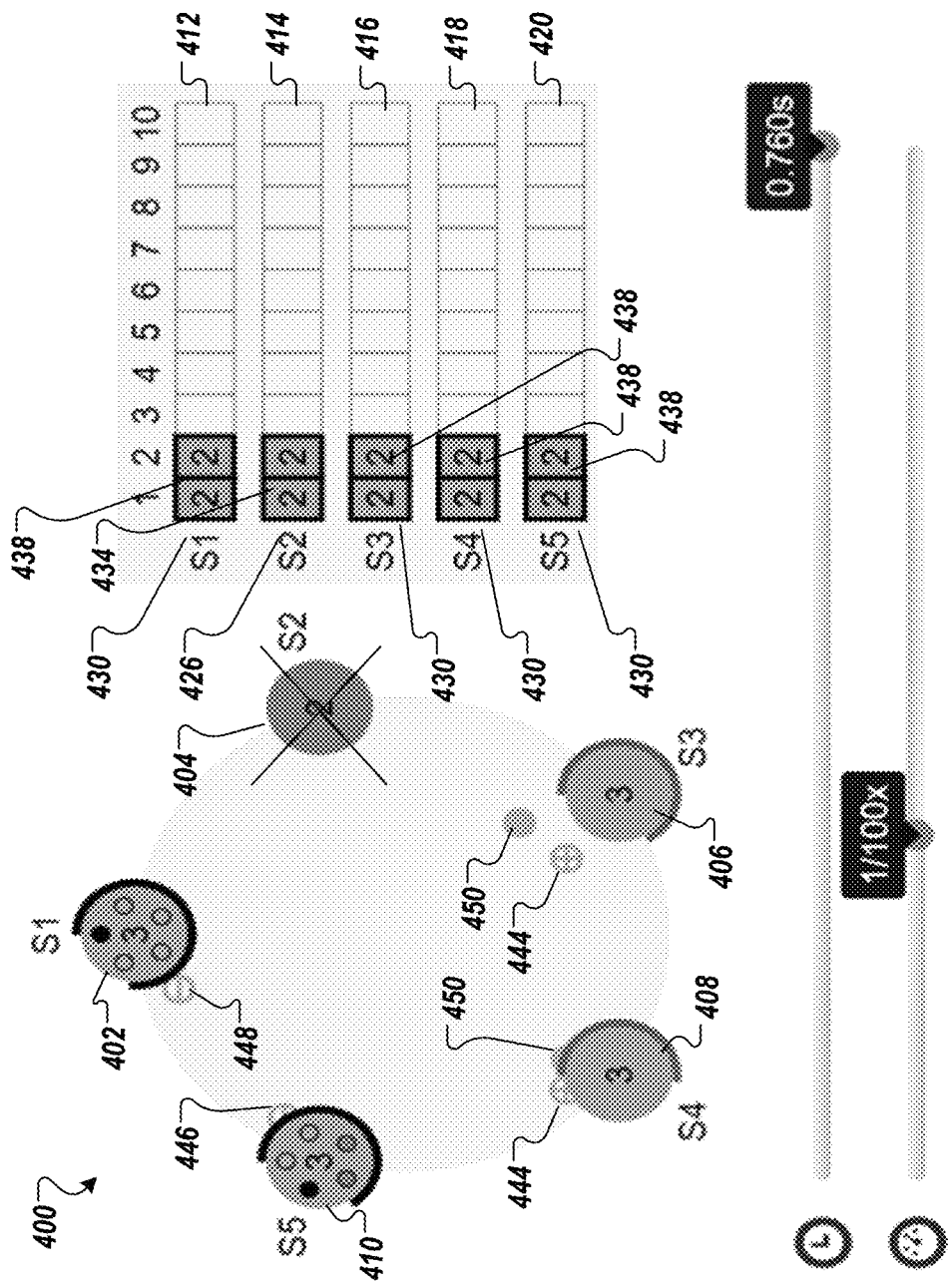
Figure 4I:
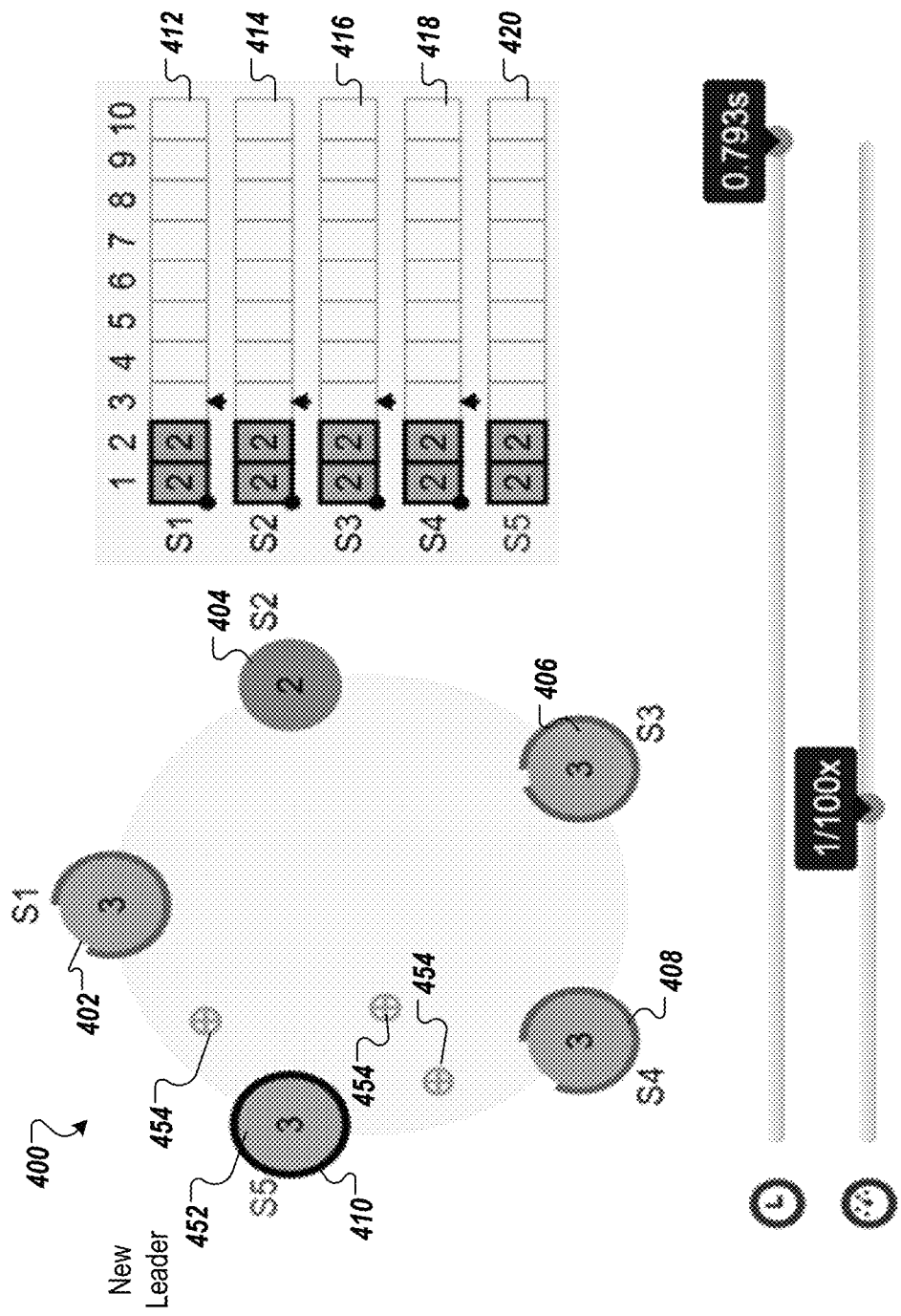
Figure 4J:
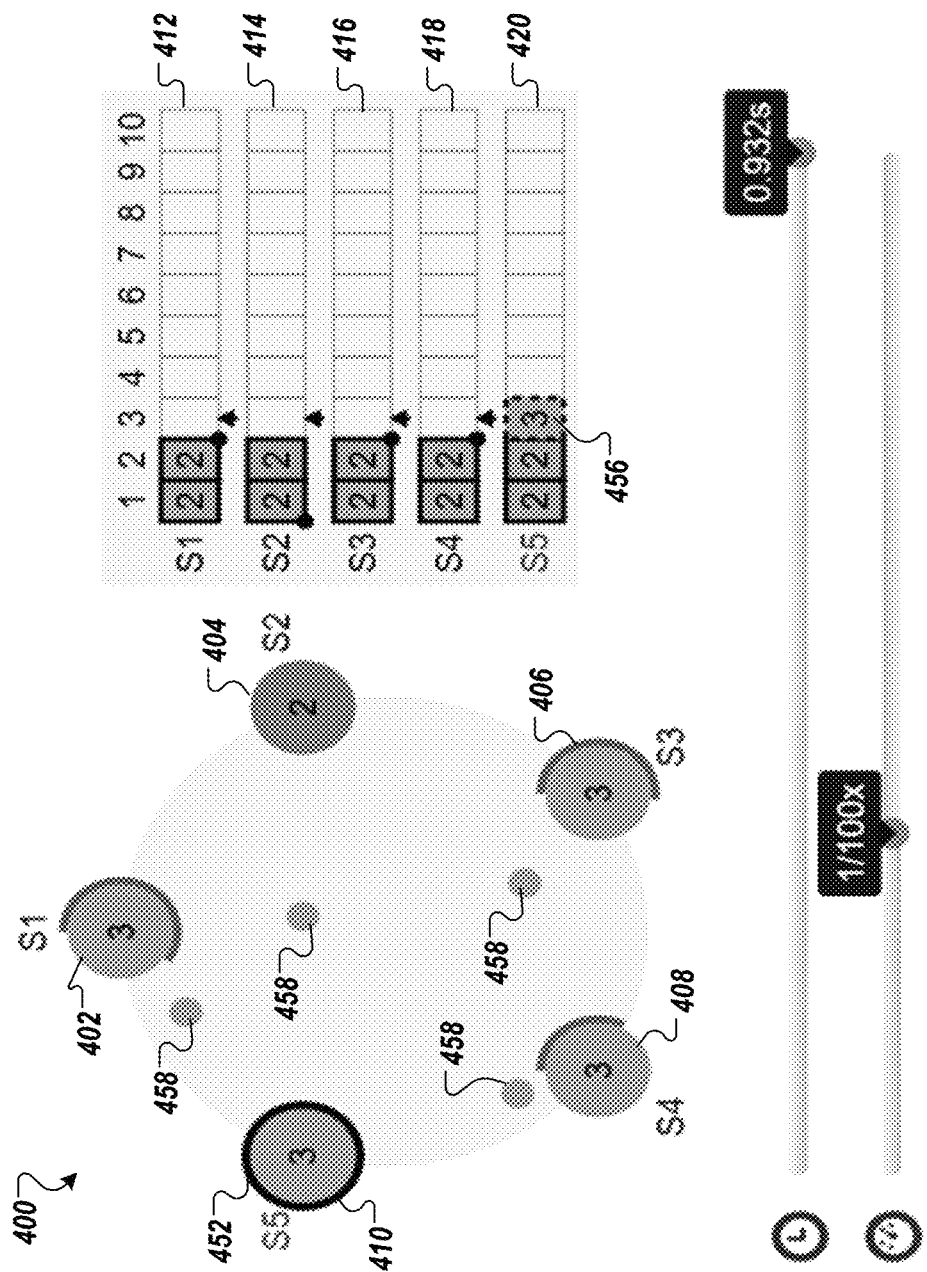
Figure 4K:
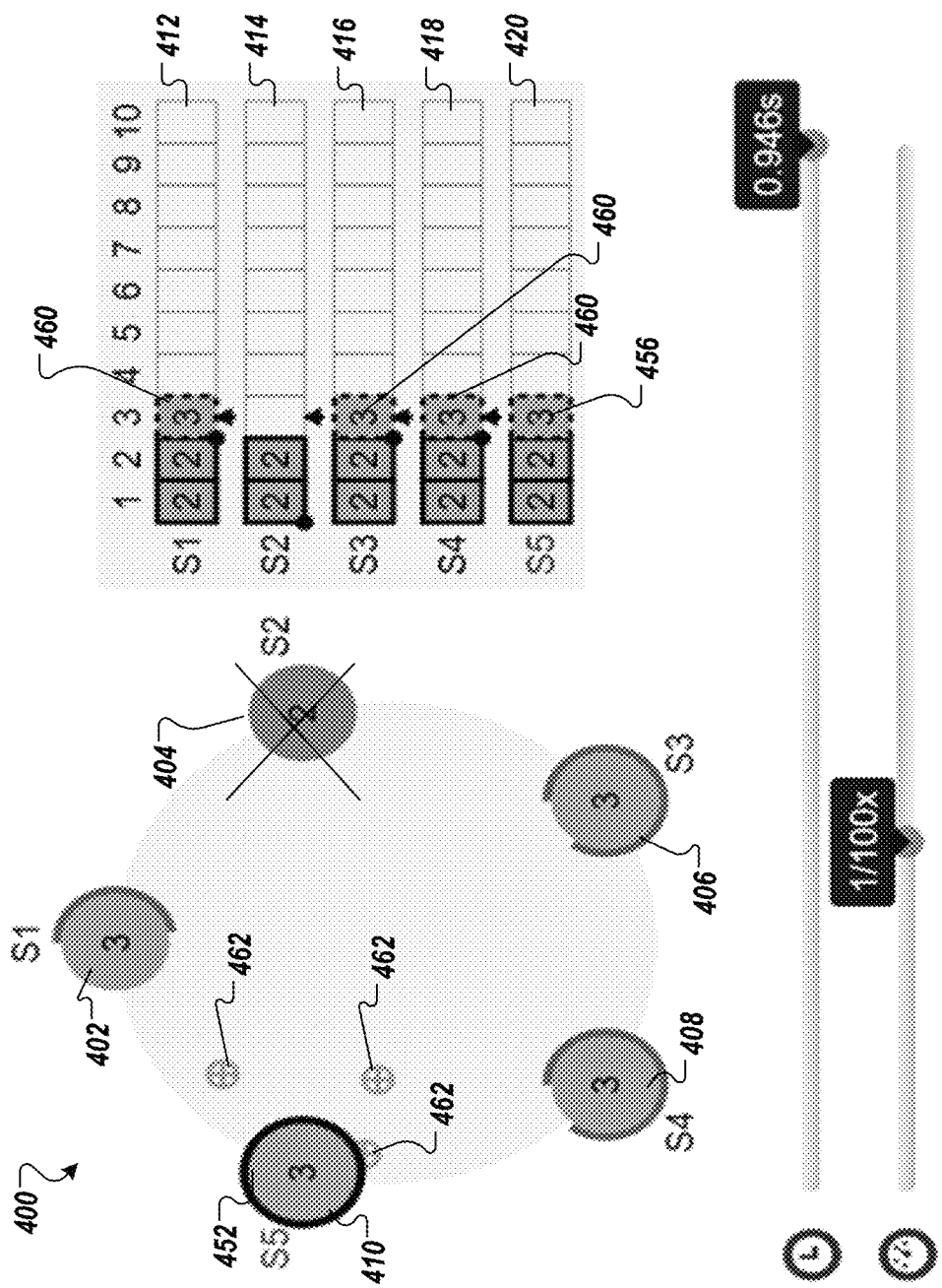
Figure 4L:
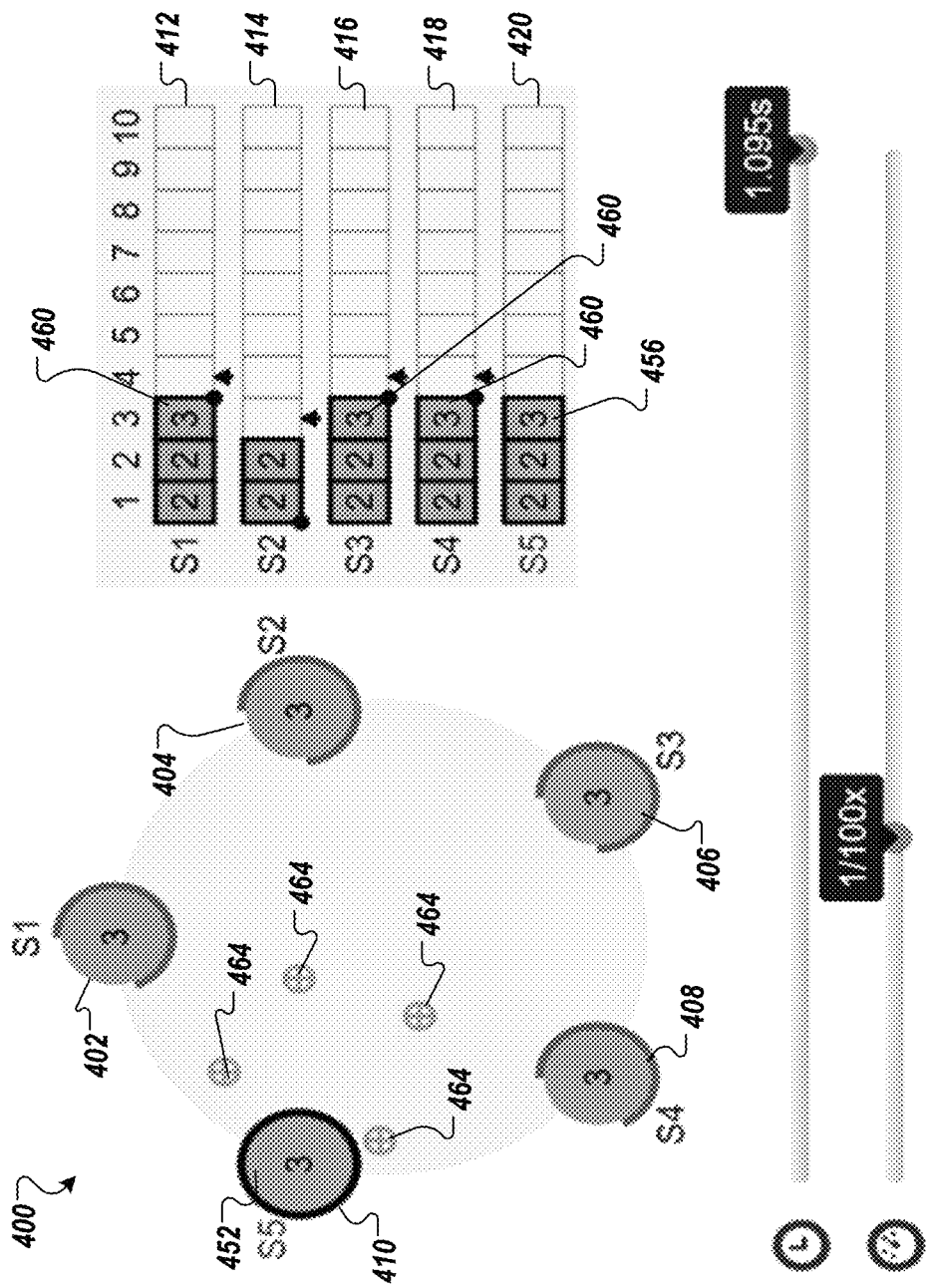
Figure 4M:
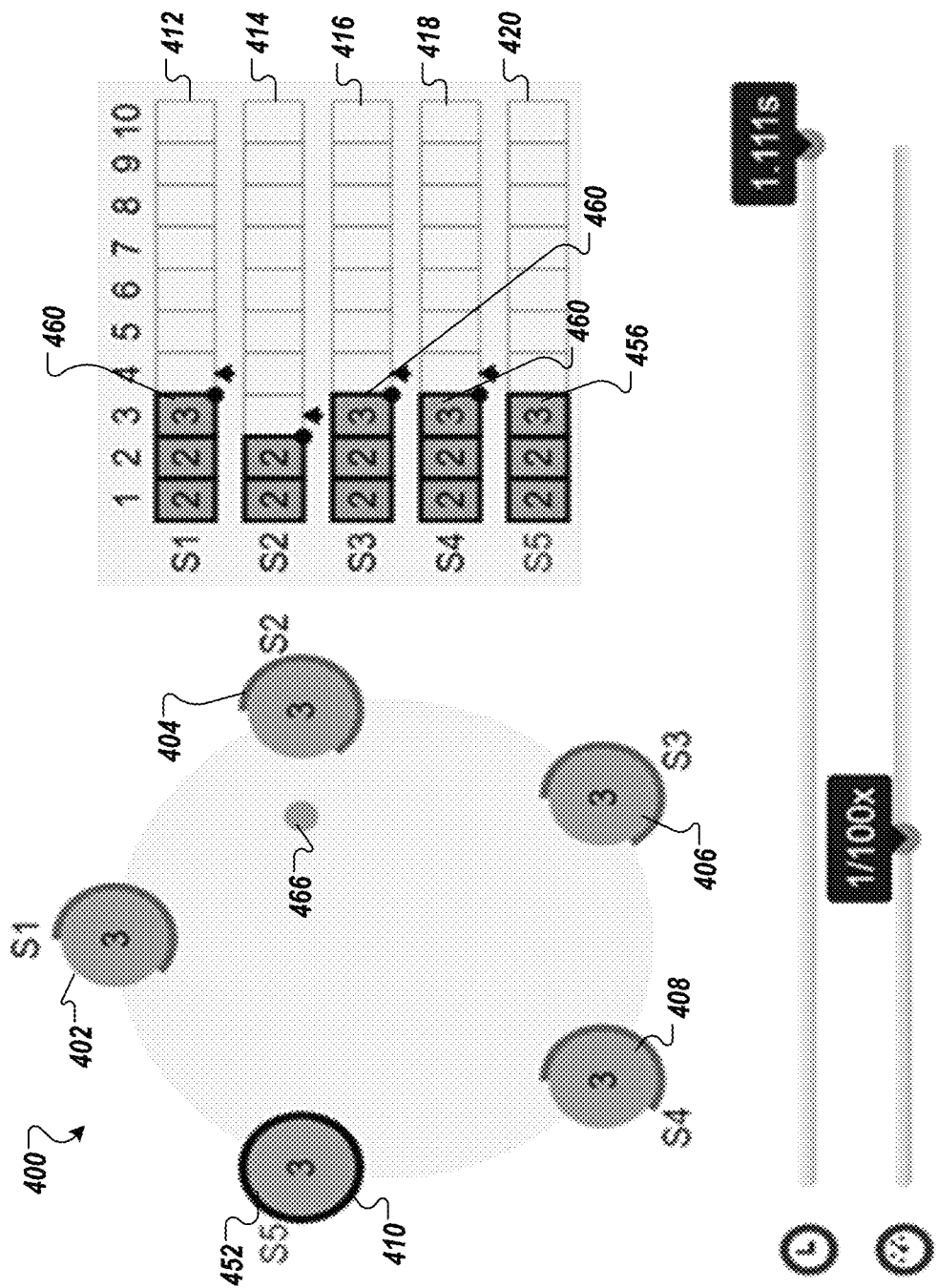
Figure 4N:
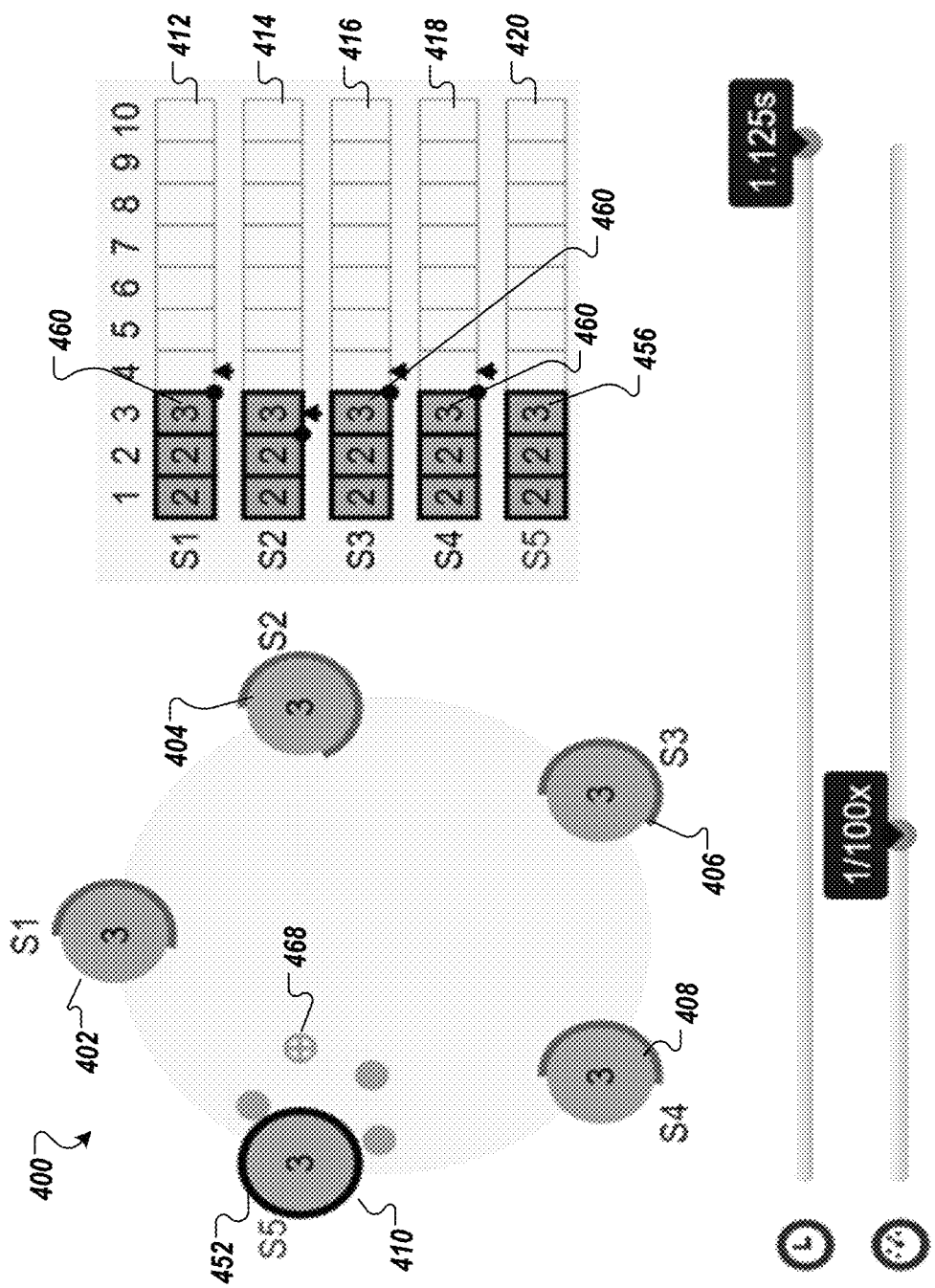

FIGS. 4A-4N illustrate example messages sent between server devices of a provisioning cluster 400 according to at least one embodiment. As illustrated in FIG. 4A, provisioning cluster 400 includes a first server 402 (S1), a second server 404 (S2), a third server 406 (S3), a fourth server 408 (S4), and a fifth server 410 (S5). Each server includes a log, including a first log 412 corresponding to first server 402, a second log 414 corresponding to second server 404, a third log 416 corresponding to third server 406, a fourth log 418 corresponding to fourth server 408, and fifth log 420 corresponding to fifth server 410. Each server has a timeout in which it expects to receive a heartbeat message from a leader. As illustrated, each timeout can be started at different time. Alternatively, timeouts of any two or more servers can be started at a same time. Having timeouts at different times can benefit a leader election process by reducing instances of split votes.

As illustrated in FIG. 4B, second server 404 is elected as a leader 422 and sends heartbeat messages 424 to each other server that are designated as followers. As long as a follower receives a heartbeat message it assumes second server 404 is still leader 422.

As illustrated in FIG. 4C, second server 404 receives a first request from an endpoint device in a session, performs an operation corresponding to the first request, and stores context information 426 for the session in a first log entry of second log 414. Second server 404 sends messages 428 to the other servers in cluster 400 to replicate context information 426 in their corresponding logs. First server 402, third server 406, fourth server 408, and fifth server 410 each receive a message 428 that includes a copy 430 of context information 426.

As illustrated in FIG. 4D, first server 402, third server 406, fourth server 408, and fifth server 410 store a copy 430 in each of a first log entry of a corresponding log and sends a message 432 back to leader 422 as confirmation that context information 426 has been replicated at the respective server.

As illustrated in FIG. 4E, second server 404 receives a second request from an endpoint device in a session or from the same endpoint device in the same session as illustrated in FIG. 4C. Second server 404 performs an operation corresponding to the second request, and stores context information 434 for the session in a second log entry of second log 414. Second server 404 sends messages 436 to the other servers in cluster 400 to replicate context information 434 in their corresponding logs. First server 402, third server 406, fourth server 408, and fifth server 410 each receive a message 436 that includes a copy 438 of context information 434.

As illustrated in FIG. 4F, first server 402, third server 406, fourth server 408, and fifth server 410 each store a copy 438 in each of a second log entry of a corresponding log and sends a message 440 back to leader 422 as confirmation that context information 434 has been replicated at the respective server.

As illustrated in FIG. 4G, second server 404 fails and a timeout of fifth server 410 expired first, causing fifth server 410 to assume that second server 404 has failed as leader. As a result, fifth server 410 initiates a leader election process by changing its status from follower to candidate, increments a term count (from 2 to 3 as illustrated), votes for itself, and sends a message 442 to each of the other nodes, requesting a vote.

As illustrated in FIG. 4H, in response to receiving a message 442, fourth server 408, and third server 406 send a response message 444 with a vote for fifth server 410. Also, as illustrated in FIG. 4H, a timeout of first server 402 also expired, causing first server 402 to assume that second server 404 has failed as leader. As a result, first server 402 also initiates a leader election process by changing its status from follower to candidate, increments a term count (from 2 to 3 as illustrated), votes for itself, and sends a message to each of the other nodes (not illustrated in FIG. 4H. Since fifth server 410 already voted for itself, fifth server sends a message 446 that rejects a vote for first server 402 (or includes a declining vote). Similarly, since first server 402 already voted for itself, in response to message 442 from fifth server 410, first server sends a message 448 that rejects a vote for fifth server 410 (or includes a declining vote). Similarly, since third server 406 and fourth server 408 already voted for fifth server 410, third server 406 and fourth server 408 each send a message 450, rejecting a vote for first server 402. As a result, fifth server 410 wins the leader election process and is elected as a new leader 452 for cluster 400, as illustrated in FIG. 4I. New leader 452 starts to send heartbeat messages and receiving confirmation messages 454 from the other nodes in cluster 400.

As illustrated in FIG. 4J, fifth server 410 receives a third request from an endpoint device in a session or from the same endpoint device in the same session as illustrated in FIG. 4A-I. Fifth server 410 performs an operation corresponding to the third request, and stores context information 456 for the session in a third log entry of fifth log 420. Fifth server 410 sends messages 458 to the other servers in cluster 400 to replicate context information 456 in their corresponding logs. First server 402, third server 406, and fourth server 408 each receive a message 458 that includes a copy 460 of context information 456.

As illustrated in FIG. 4K, first server 402, third server 406, and fourth server 408 each store a copy 460 in each of a third log entry of a corresponding log and sends a message 462 back to new leader 452 (fifth server 410) as confirmation that context information 434 has been replicated at the respective server. Since second server 404 is still failed, it does not respond to message 458 from fifth server 410 and does not store a copy 460 in a third log entry of second log 414.

As illustrated in FIG. 4L, second server 404 is no longer failed and responds with a response message 464 to fifth server's next heartbeat message (not illustrated in FIG. 4L).

As illustrated in FIG. 4M, fifth server 410, in response to receiving a response message 464 from second server 404, fifth server 410 sends a messages 466 to second server 404 that includes a copy 460 of context information 456.

Second server 404 stores copy 460 in a third log entry of second log 414 to the other servers in cluster 400 to replicate context information 426 in their corresponding logs. First server 402, third server 406, fourth server 408, and fifth server 410 each receive a message 428 that includes a copy 430 of context information 426.

As illustrated in FIG. 4N, second server 404 stores copy 460 in a third log entry of second log 414 and sends a message 468 back to new leader 452 as confirmation that context information 456 has been replicated at second server 404.

Figure 5:
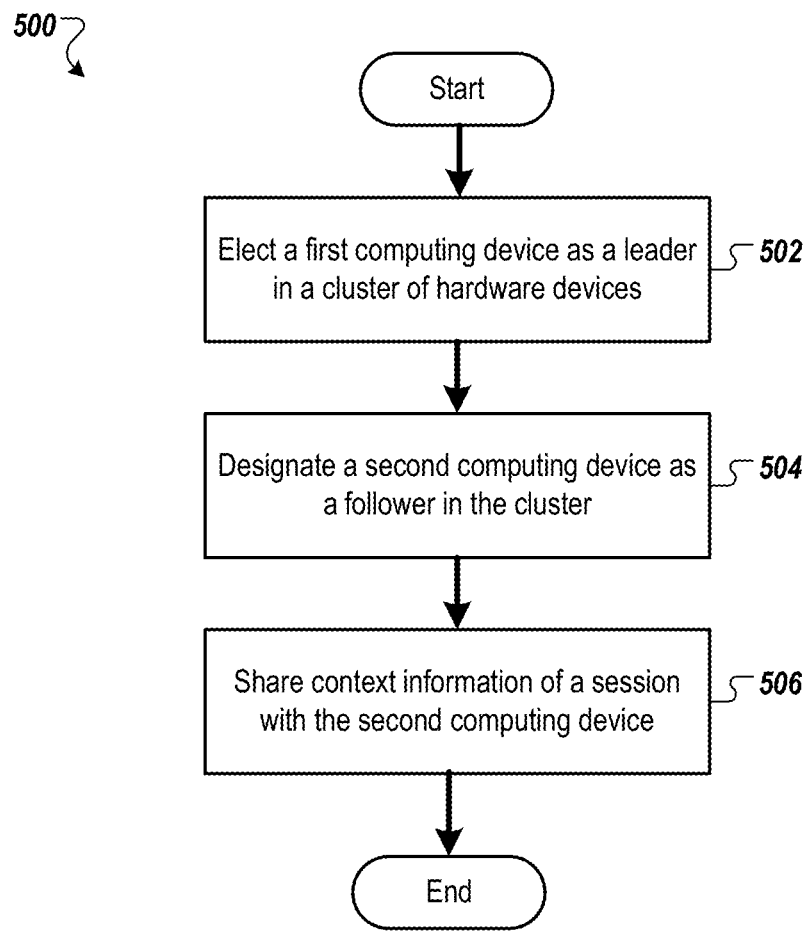
FIG. 5 is a flow diagram of a method of sharing context information of a session during endpoint provisioning according to at least one embodiment.

FIG. 5 is a flow diagram of a method 500 of maintaining a secure session state with failover during endpoint provisioning according to at least one embodiment. Method 500 may be performed by processing logic that may comprise hardware (e.g., circuitry, dedicated logic, programmable logic, microcode, etc.), software, firmware, or a combination thereof. In at least one embodiment, method 500 is performed by any computing device of cluster 100 of FIG. 1. In at least one embodiment, method 500 is performed by any server of cluster 400 of FIG. 4. Alternatively, method 500 may be performed by one or more devices as described herein.

Referring back to FIG. 5, method 500 begins by processing logic electing, a first computing device as a leader for a session with an endpoint device for provisioning the endpoint device (block 502). Processing logic designates a second computing device as a follower for the session (block 504). Processing logic shares context information of the session with the second computing device such that the second computing device resumes the session if the leader fails (block 506), and method 500 ends. In at least one embodiment, processing logic at block 506 share context information using a consensus protocol.

Figure 6:
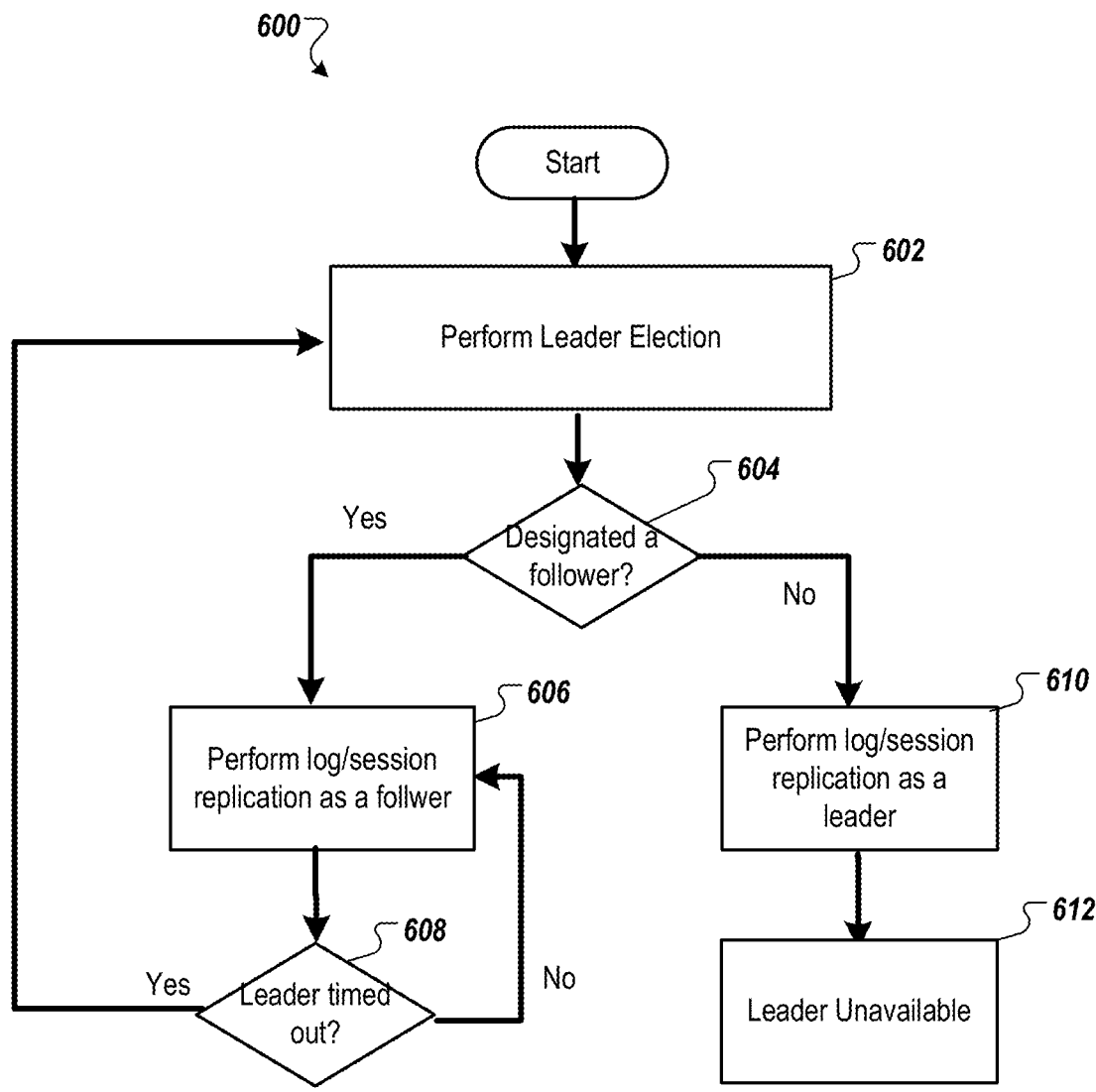
FIG. 6 is a flow diagram of a method of maintaining a secure session state with failover during endpoint provisioning according to at least one embodiment.

FIG. 6 is a flow diagram of a method 600 of maintaining a secure session state with failover during endpoint provisioning according to at least one embodiment. Method 600 may be performed by processing logic that may comprise hardware (e.g., circuitry, dedicated logic, programmable logic, microcode, etc.), software, firmware, or a combination thereof. In at least one embodiment, method 600 is performed by any computing device of cluster 100 of FIG. 1. In at least one embodiment, method 600 is performed by any server of cluster 400 of FIG. 4. Alternatively, method 600 may be performed by one or more devices as described herein.

Referring back to FIG. 6, method 600 begins by performing a leader election (block 602). Processing logic determines if it is designated as a follower (block 604). Responsive to being a follower, processing logic performs log replication as a follower (or session replication), as described herein (block 606). For example, processing logic receives context information for a session from a leader in a cluster of hardware devices. Processing logic determines whether the leader fails by determining if a leader has timed out (block 608). If processing logic determines that leader has not failed (i.e., not timed out), processing logic returns to block 606 and continues to perform log replication as a follower. However, if processing logic determines that leader has failed (i.e., leader has timed out) at block 608, processing logic returns to block 602 to perform a leader election. If at block 604, processing logic determines that it is not designated as a follower because processing logic has been elected as leader, processing logic performs log replication as a leader (block 610). Processing logic continues as leader until it becomes unavailable at block 612.

In at least one embodiment, before processing logic changes a status from follower to leader, processing logic can initiate a leader election process that elects the processing logic as the new leader by consensus with other devices in the cluster. In at least one embodiment, processing logic, in response to failing leader election at block 602, sends a first identifier and a first address of the first computing device to the endpoint device. Similarly, in response to a new leader election at block 602, an updated identifier and address can be sent to the endpoint device, the updated identifier and address corresponding to a new elected leader. Processing logic detects that the first computing device has failed and initiates a leader election to elect a new leader of the provisioning cluster. Processing logic can change the second computing device's status from the follower to the new leader at block 606 and send a second identifier and a second address of the second computing device to the endpoint device, responsive to changing the second computing device from the follower to the new leader.

Figure 7:
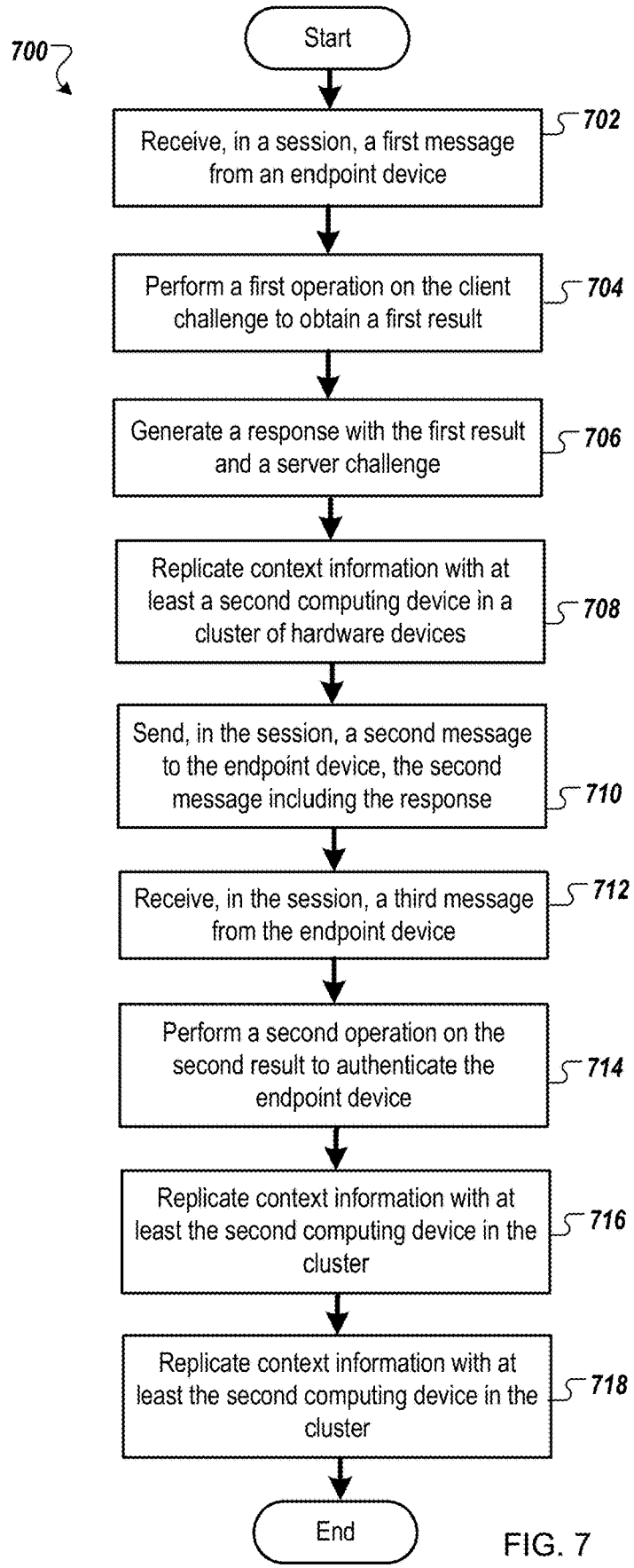
FIG. 7 is a flow diagram of a method of performing multiple transactions in a session while maintaining a secure session state with failover during endpoint provisioning according to at least one embodiment.

FIG. 7 is a flow diagram of a method 700 of performing multiple transaction in a session while maintaining a secure session state with failover during endpoint provisioning according to at least one embodiment. Method 700 may be performed by processing logic that may comprise hardware (e.g., circuitry, dedicated logic, programmable logic, microcode, etc.), software, firmware, or a combination thereof. In at least one embodiment, method 700 is performed by any computing device of cluster 100 of FIG. 1. In at least one embodiment, method 700 is performed by any server of cluster 400 of FIG. 4. Alternatively, method 700 may be performed by one or more devices as described herein.

Referring back to FIG. 7, method 700 begins by receiving, in a session, a first message from an endpoint device (block 702). The first message can include a client challenge. Processing logic performs a first operation on the client challenge to obtain a first result (block 704). Processing logic generates a response with the first result and a server challenge (block 706). Processing logic replicates the context information with at least a second computing device in a cluster of hardware devices using a consensus protocol (block 708). The context information can include the first result and the server challenge. Processing logic sends, in the session, a second message to the endpoint device, the message including the response (block 710). Processing logic receives, in the session, a third message from the endpoint device (block 712). The third message includes a second result to the server challenge. Processing logic performs a second operation on the second result to authenticate the endpoint device (block 714). Processing logic replicates the context information with at least the second computing device using the consensus protocol (block 716). The context information includes the first result, the server challenge, and the second result. Processing logic sends, in the session, a fourth message to the endpoint device (block 718). The fourth message can include an indication of authentication.

In at least one embodiment, at block 702, processing logic receives the first message from the endpoint device via an automated test equipment operatively coupled to the endpoint device and, at block 704, processing logic sends the second message to the endpoint device via the automated test equipment.

FIG. 8 is a diagram of one embodiment of a computer system 800 in which any of the methodologies described herein may be performed according to at least one embodiment. The computer system 800 may include a processor 802, main memory 804, storage memory 806, chipset 808, one or more peripherals 810, a network interface device 822, and a removable storage device interface 803 is configurable to connect with a removable storage device 815. The processor 802 is operable to execute instructions 826 (or software) according to any of the methodologies described herein. The instructions 826 may include instructions that are stored in main memory 804 or in removable storage device 805 and executed by the processor 802 and can be used to perform various operations regarding authentication, identity, attestation, and live security check services as described herein. In at least one embodiment, the computer system 800 represents any computing device of cluster 100 of FIG. 1. In at least one embodiment, the computer system 800 represents any servers of cluster 400 of FIG. 4.

The computer system 800 in some cases may be connected (e.g., networked) to other machines in a LAN, an intranet, an extranet, or the Internet. The computer system 800 can be a host in a cloud, a cloud provider system, a cloud controller, a server, a client, or any other machine. The computer system 800 can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 800 includes a processor 802 (e.g., host processor or processing device), a main memory 804 (e.g., read-only memory (ROM), flash memory, dynamic random access memory (DRAM), a storage memory 806 (e.g., flash memory, static random access memory (SRAM), etc.), and a secondary memory 818 (e.g., a data storage device in the form of a drive unit, which may include fixed or removable computer-readable storage medium), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like.

In at least one embodiment, the processor 802 may reside on a first integrated circuit and the main memory 804 may reside on a second integrated circuit. For example, the integrated circuit may include a host computer (e.g., CPU having one more processing cores, L1 caches, L2 caches, or the like), a host controller, or other types of processors 802. The second integrated circuit may include a memory device coupled to the host device, and whose primary functionality is dependent upon the host device, and can therefore be considered as expanding the host device's capabilities, while not forming part of the host device's core architecture. The memory device may be capable of communicating with the host device. For example, the memory device may be a single IC or a multi-IC Module including any combination of single IC devices on a common integrated circuit substrate. The components of FIG. 17 can reside on "a common carrier substrate," such as, for example, an integrated circuit ("IC") die substrate, a multi-IC Module substrate, or the like. Alternatively, the memory device may reside on one or more printed circuit boards, such as, for example, a mother board, a daughter board, or other type of circuit card. In other implementations, the main memory and processor 802 can reside on the same or different carrier substrates.

The computer system 800 may include a chipset 808, which refers to a group of integrated circuits, or chips, that are designed to work with the processor 802 and controls communications between the processor 802 and external devices. For example, the chipset 808 may be a set of ICs on a motherboard that links the processor 802 to very high-speed devices, such as main memory 804 and graphic controllers, as well as linking the processing device to lower-speed peripheral buses of peripherals 810, such as USB, PCI or ISA buses. In at least embodiment, the removable storage device interface 803 can be implemented in the chipset 808.

The computer system 800 may further include a network interface device 822. The computer system 800 also may include one or more peripherals 810, such as a video display unit (e.g., a liquid crystal display (LCD)) connected to the computer system through a graphics port and graphics chipset, an alphanumeric input device (e.g., a keyboard), a cursor control device (e.g., a mouse), a signal generation device (e.g., a speaker), or the like.

Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular implementations may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

While the disclosure has been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A provisioning cluster of hardware devices for provisioning endpoint devices, the provisioning cluster comprising:
 a first computing device, wherein the first computing device is elected as a leader, by the provisioning cluster, for a session with an endpoint device; and
 a second computing device, wherein the second computing device is designated as a follower for the session, wherein the first computing device is to:
  receive, in the session, a first message from the endpoint device;
  perform a first operation in connection with the first message to obtain a first result;
  generate a response with the first result;
  determine context information of the session based on at least some information in the first message, wherein the context information comprises the first result;
  share the context information of the session with the second computing device using a consensus protocol such that the second computing device replicates the context information of the session and resumes the session if the leader fails; and
  send, in the session, a second message to the endpoint device, the second message comprising the response.

2. The provisioning cluster of claim 1, wherein the first computing device is a hardware security module (HSM) with a physical security perimeter.

3. The provisioning cluster of claim 1, wherein the consensus protocol is the Reliable, Replicated, Redundant, and Fault-Tolerant (RAFT) consensus protocol.

4. The provisioning cluster of claim 1, wherein the consensus protocol is the Paxos consensus protocol.

5. The provisioning cluster of claim 1, wherein the first computing device is to:
  receive, in the session, a third message from the endpoint device, the third message comprising a second result in connection with the second message;
  perform a second operation on the second result to authenticate the endpoint device;
  use the consensus protocol to replicate the context information of the session with at least the second computing device, wherein the context information comprises the first result and the second result; and
  send, in the session, a fourth message to the endpoint device, the fourth message comprising an indication of authentication.

6. The provisioning cluster of claim 1, wherein the first computing device is to:
  receive the first message from the endpoint device via an automated test equipment operatively coupled to the endpoint device; and
  send the second message to the endpoint device via the automated test equipment.

7. The provisioning cluster of claim 1, wherein the first computing device is to share the context information of the session with at least the second computing device by sending a signed message to the second computing device, the signed message comprising the context information.

8. A provisioning cluster of hardware devices for provisioning endpoint devices, the provisioning cluster comprising:
  a first computing device, wherein the first computing device is elected as a leader, by the provisioning cluster, for a session with an endpoint device; and
  a second computing device, wherein the second computing device is designated as a follower for the session, wherein the first computing device is to send a first identifier and a first address of the first computing device to the endpoint device and share context information of the session with the second computing device such that the second computing device resumes the session if the leader fails, wherein:
    the second computing device is to:
      detect that the first computing device has failed;
      initiate a leader election to elect a new leader of the provisioning cluster;
      change from the follower to the new leader; and
      send a second identifier and a second address of the second computing device to the endpoint device, responsive to the second computing device changing from the follower to the new leader.

9. A method comprising:
  electing, by a provisioning cluster of hardware devices, a first computing device as a leader for a session with an endpoint device for provisioning the endpoint device;
  designating, by the provisioning cluster of hardware devices, a second computing device as a follower for the session;
  receiving, in the session, a first message from the endpoint device;
  performing a first operation in connection with the first message to obtain a first result;
  generating a response with the first result;
  determining context information of the session based on at least some information in the first message, wherein the context information comprises the first result;
  sharing, by the first computing device, the context information of the session with the second computing device using a consensus protocol such that the second computing device replicates the context information of the session and resumes the session if the leader fails; and
  sending, in the session, a second message to the endpoint device, the second message comprising the response.

10. The method of claim 9, further comprising:
  receiving, in the session, a third message from the endpoint device, the third message comprising a second result in connection with the second message;
  performing a second operation on the second result to authenticate the endpoint device;
  replicating the context information with at least the second computing device using the consensus protocol, wherein the context information comprises the first result and the second result; and
  sending, in the session, a fourth message to the endpoint device, the fourth message comprising an indication of authentication.

11. The method of claim 9, wherein:
  receiving the first message from the endpoint device comprises receiving the first message from the endpoint device via an automated test equipment operatively coupled to the endpoint device; and
  sending the second message to the endpoint device comprises sending the second message to the endpoint device via the automated test equipment.

12. A method comprising:
  electing, by a provisioning cluster of hardware devices, a first computing device as a leader for a session with an endpoint device for provisioning the endpoint device;
  designating, by the provisioning cluster of hardware devices, a second computing device as a follower for the session;
  sharing, by the first computing device, context information of the session with the second computing device such that the second computing device resumes the session if the leader fails;
  sending a first identifier and a first address of the first computing device to the endpoint device;
  detecting that the first computing device has failed;
  initiating a leader election to elect a new leader of the provisioning cluster;
  changing the second computing device from the follower to the new leader; and
  sending a second identifier and a second address of the second computing device to the endpoint device, responsive to changing the second computing device from the follower to the new leader.

13. A first computing device of a provisioning cluster of hardware device, the first computing device comprising:
  a memory device to store instructions; and
  a processing device operatively coupled to the memory device, wherein the processing device and the memory device are located within a physical security perimeter, wherein the first computing device is elected, by the provisioning cluster, as a leader for a session with an endpoint device for provisioning the endpoint device, wherein the processing device is to execute the instructions to perform operations comprising:
    receiving, in the session, a first message from the endpoint device;
    performing a first operation in connection with the first message to obtain a first result;
    generating a response with the first result;
    determining context information of the session based on at least some information in the first message, wherein the context information comprises the first result;

sharing the context information of the session with a second computing device of the provisioning cluster using a consensus protocol such that the second computing device replicates the context information of the session and resumes the session if the leader fails; and sending, in the session, a second message to the endpoint device, the second message comprising the response.

14. The first computing device of claim 13, wherein the processing device is to execute the instructions to perform operations further comprising:

receiving, in the session, a third message from the endpoint device, the third message comprising a second result in connection with the second message;

performing a second operation on the second result to authenticate the endpoint device;

replicating the context information with at least the second computing device using the consensus protocol, wherein the context information comprises the first result and the second result; and sending, in the session, a fourth message to the endpoint device, the fourth message comprising an indication of authentication.

* * * * *